US010127730B2

(12) United States Patent
Huddy

(10) Patent No.: US 10,127,730 B2
(45) Date of Patent: Nov. 13, 2018

(54) AUGMENTED REALITY AND VIRTUAL REALITY LOCATION-BASED ATTRACTION SIMULATION PLAYBACK AND CREATION SYSTEM AND PROCESSES FOR SIMULATING PAST ATTRACTIONS AND PRESERVING PRESENT ATTRACTIONS AS LOCATION-BASED AUGMENTED REALITY AND VIRTUAL REALITY ATTRACTIONS

(71) Applicant: Jason Kristopher Huddy, Valley Village, CA (US)

(72) Inventor: Jason Kristopher Huddy, Valley Village, CA (US)

( * ) Notice: Subject to any disclaimer, the term of this patent is extended or adjusted under 35 U.S.C. 154(b) by 0 days.

(21) Appl. No.: 15/689,192

(22) Filed: Aug. 29, 2017

(65) Prior Publication Data

US 2018/0089898 A1    Mar. 29, 2018

Related U.S. Application Data

(60) Provisional application No. 62/401,065, filed on Sep. 28, 2016.

(51) Int. Cl.
| | | |
|---|---|---|
| *G06T 19/00* | (2011.01) | |
| *G06F 3/01* | (2006.01) | |
| *G06F 3/0488* | (2013.01) | |
| *G06F 17/50* | (2006.01) | |
| *H04L 29/08* | (2006.01) | |
| *H04W 4/02* | (2018.01) | |
| *G09B 5/00* | (2006.01) | |

(52) U.S. Cl.
CPC ............ *G06T 19/006* (2013.01); *G06F 3/011* (2013.01); *G06F 3/04886* (2013.01); *G06F 17/5009* (2013.01); *G09B 5/00* (2013.01); *H04L 67/1021* (2013.01); *H04W 4/02* (2013.01)

(58) Field of Classification Search
None
See application file for complete search history.

(56) References Cited

U.S. PATENT DOCUMENTS

| | | | | |
|---|---|---|---|---|
| 2009/0322788 | A1* | 12/2009 | Sawano | H04N 1/00244 345/632 |
| 2013/0103760 | A1* | 4/2013 | Golding | H04L 67/22 709/204 |
| 2014/0058822 | A1* | 2/2014 | Sobecks | G06Q 30/02 705/14.37 |
| 2015/0317829 | A1* | 11/2015 | Carter | G02B 27/01 345/633 |
| 2016/0381398 | A1* | 12/2016 | Saxena | H04N 21/2353 348/39 |

* cited by examiner

*Primary Examiner* — Ke Xiao
*Assistant Examiner* — Jed-Justin Imperial
(74) *Attorney, Agent, or Firm* — Plager Schack LLP; Mark H. Plager; Stephen Hallberg

(57) ABSTRACT

An augmented reality and virtual reality location-based attraction simulation playback and creation system that simulates past attractions and preserves present attractions as location-based augmented reality and virtual reality simulations and processes for simulating past attractions and preserving present attractions as location-based augmented reality and virtual reality simulations of the attractions are disclosed.

11 Claims, 11 Drawing Sheets

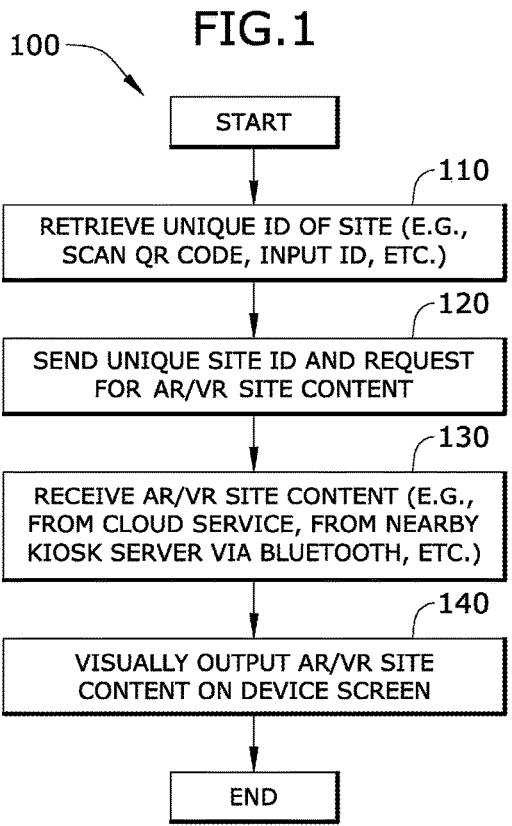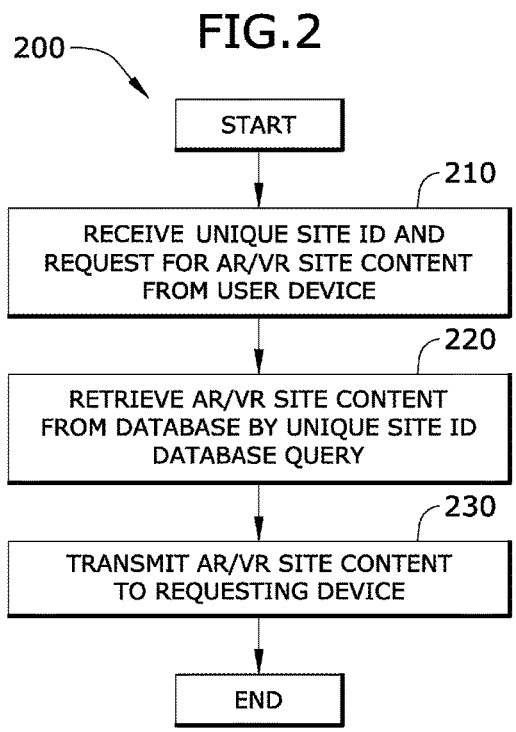

AUGMENTED REALITY AND VIRTUAL REALITY LOCATION-BASED ATTRACTION SIMULATION PLAYBACK AND CREATION SYSTEM AND PROCESSES FOR SIMULATING PAST ATTRACTIONS AND PRESERVING PRESENT ATTRACTIONS AS LOCATION-BASED AUGMENTED REALITY AND VIRTUAL REALITY ATTRACTIONS

CLAIM OF BENEFIT TO PRIOR APPLICATION

This application claims benefit to U.S. Provisional Patent Application 62/401,065, entitled "SIMULATING DEFUNCT ATTRACTIONS," filed Sep. 28, 2016. The U.S. Provisional Patent Application 62/401,065 is incorporated herein by reference.

BACKGROUND

Embodiments of the invention described in this specification relate generally to simulating defunct attractions, and more particularly, to an augmented reality and virtual reality location-based attraction simulation playback and creation system and processes for simulating past attractions and preserving present attractions as location-based augmented reality and virtual reality simulations of the attractions.

Through the ages, many theme park or amusement park attractions and/or rides have gone defunct or have been decommissioned. While many other operational attractions exist at theme parks and amusement parks in the present day, many of the old rides and attractions which are now defunct or decommissioned would spark the interest of a great many people, yet there is no solution for the many defunct and decommissioned rides and attractions.

Therefore, what is needed is a theme park attraction and accompanying augmented reality (AR) and/or virtual reality (VR) application that simulates recreations of decommissioned amusement or theme park rides and attractions no longer in existence, as well as historical sites and events, and allows for crowd-sourced creation of new simulations for present and upcoming attractions.

BRIEF DESCRIPTION

Some embodiments of the invention include an augmented reality and virtual reality location-based attraction simulation playback and creation system that simulates past attractions and preserves present attractions as location-based augmented reality and virtual reality simulations. Some embodiments include processes for simulating past attractions and preserving present attractions as location-based augmented reality and virtual reality simulations of the attractions.

In some embodiments, the processes for simulating past attractions and preserving present attractions as location-based augmented reality and virtual reality simulations of the attractions include a site ID-based AR/VR simulation playback process for requesting and receiving a location-based AR/VR simulation of a past attraction based on a site ID at a location associated with the past attraction, a site ID-based replay AR/VR server process for transmitting location-based AR/VR simulation content of a past attraction to a requesting mobile device based on a site ID at a location associated with the past attraction, a geolocation-based past attraction look-up table (LUT) discovery and location-based AR/VR simulation playback process for discovering a site ID and a location-based AR/VR simulation of a past attraction at a location within a threshold proximity of a geolocation of a requesting mobile device, a geolocation-based past attraction discovery request and location-based AR/VR simulation playback process for requesting a server to search for location-based AR/VR simulations of past attractions based on a geolocation of a requesting mobile device, a geolocation-based past attraction server-side discovery process for searching for a location-based AR/VR simulation of a past attraction based on a geolocation of a requesting mobile device, and a crowd-sourced location-based attraction preservation process for preserving a present attraction as at least one of a location-based AR simulation of the present attraction and a location-based VR simulation of the present attraction.

In some embodiments, the augmented reality and virtual reality location-based attraction simulation playback and creation system includes a simulation playback and creation service that is hosted by a cloud server computing device. In some embodiments, the augmented reality and virtual reality location-based attraction simulation playback and creation system includes a site identification database that stores information identifying past attractions, sites, and events that are associated with one or more location-based augmented reality (AR) and virtual reality (VR) simulations of the past attractions, sites, and events. In some embodiments, the augmented reality and virtual reality location-based attraction simulation playback and creation system includes a simulation content database that stores content for the location-based AR and VR simulations. In some embodiments, the content includes images, video clips, audio clips, textual information, computer generated imagery (CGI) animations, and other types of content used to enhance an experience at a location associated with a past attraction through the location-based AR and VR simulations.

Examples of past attractions include, without limitation, defunct attractions no longer in existence and old attractions which still exist but are decommissioned or otherwise no longer operable. In some cases, the past attractions are events which occurred at a specific time in the past at a particular location. Past attraction sites may include attractions or events (or sometimes both). Examples of past attraction sites include past theme parks and amusement parks, natural parks, geological sites, and historical sites, the locations of which past historical events occurred or significant historical artefacts existed, such as architectural structures, which may be in disrepair or no longer in existence.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments, and wherein:

FIG. 1 conceptually illustrates a site ID-based AR/VR simulation playback process for requesting and receiving a location-based AR/VR simulation of a past attraction based on a site ID at a location associated with the past attraction in some embodiments.

FIG. 2 conceptually illustrates a site ID-based replay AR/VR server process for transmitting location-based AR/VR simulation content of a past attraction to a requesting mobile device based on a site ID at a location associated with the past attraction in some embodiments.

Figure 3:
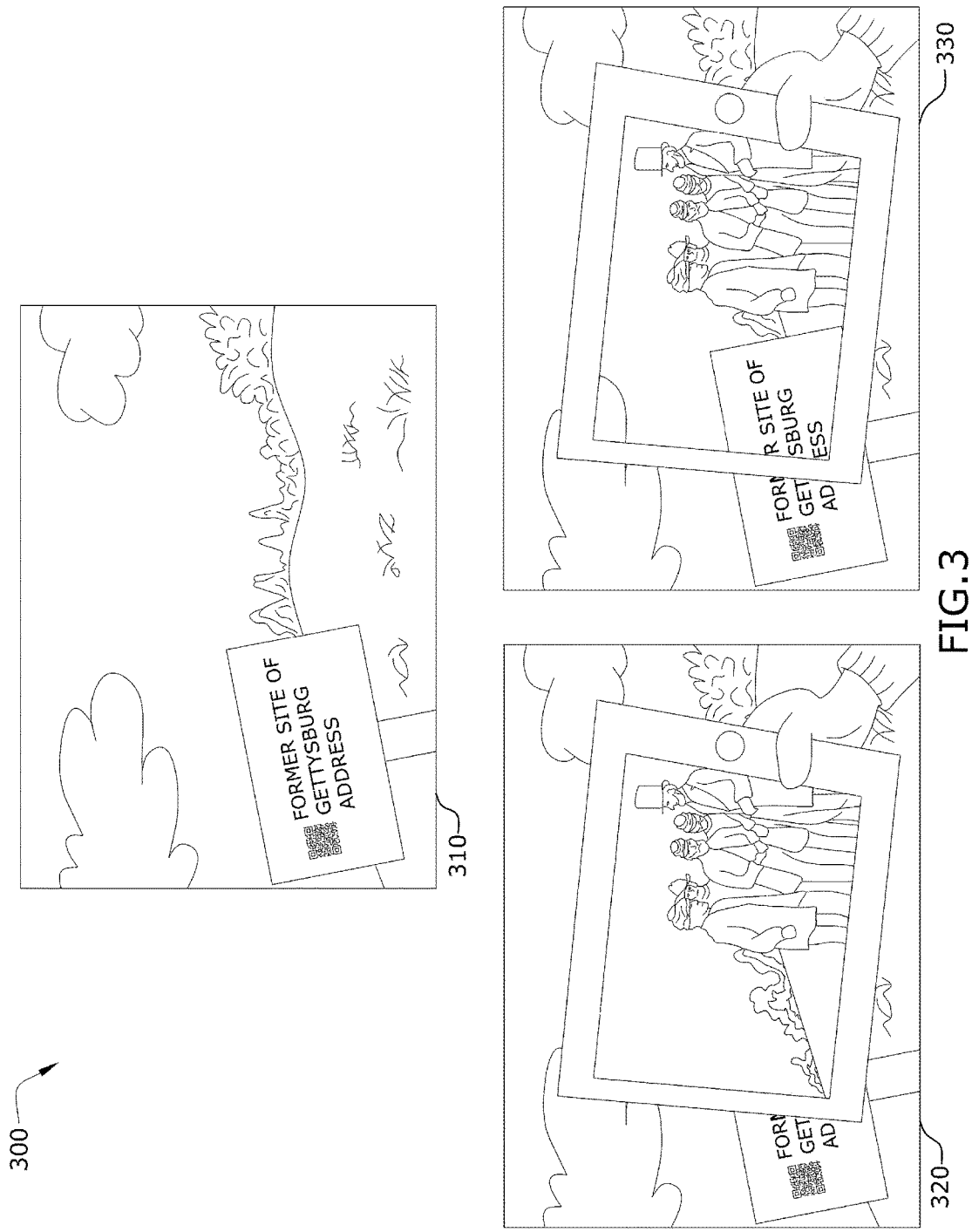

FIG. 3 conceptually illustrates a schematic example diagram of site ID-based AR/VR location-based simulation playback as both a location-based AR simulation and a location-based VR simulation of a past attraction associated with the site ID when a user is at a geolocation of the past attraction.

Figure 4:
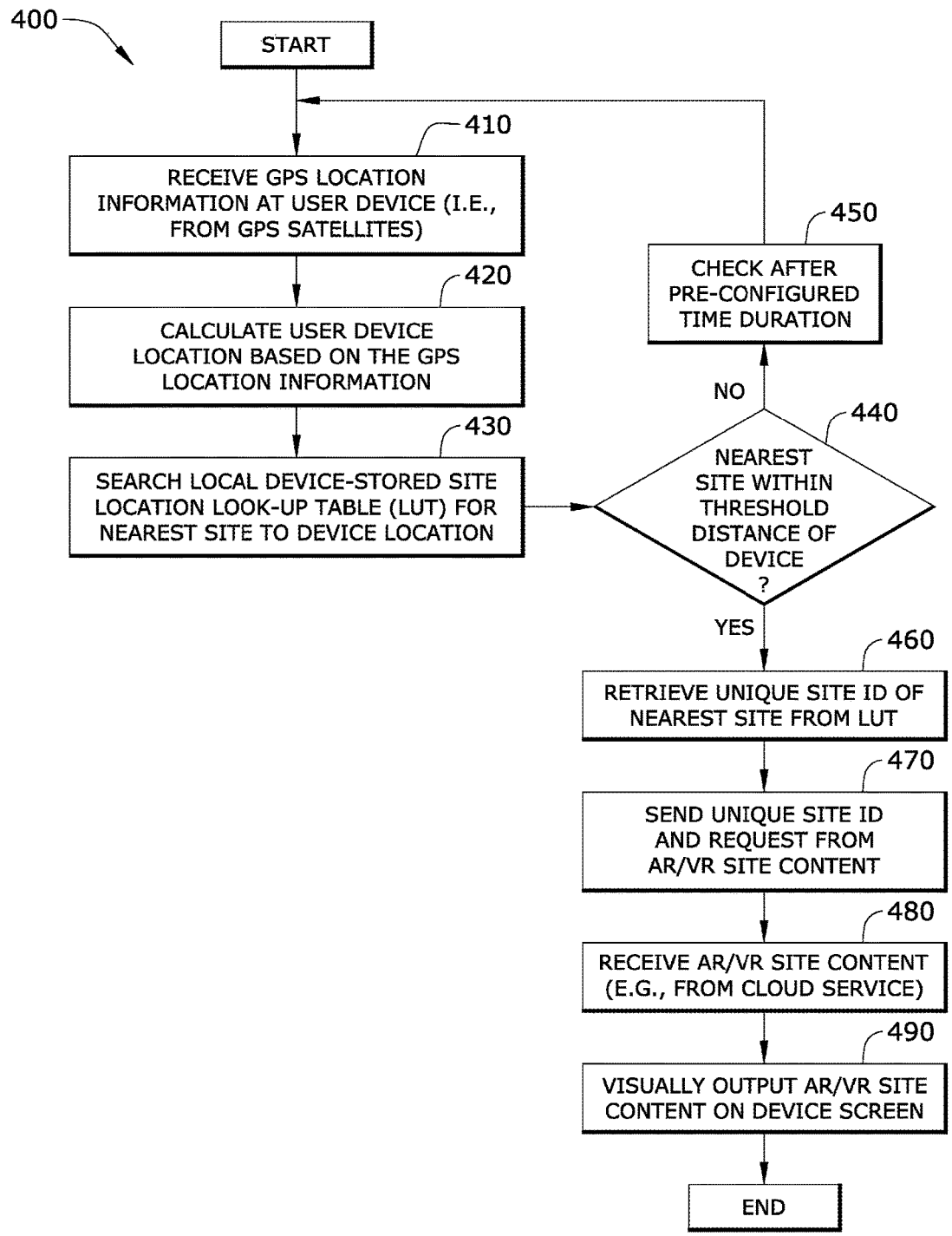

FIG. 4 conceptually illustrates a geolocation-based past attraction look-up table (LUT) discovery and location-based AR/VR simulation playback process for discovering a site ID and a location-based AR/VR simulation of a past attraction at a location within a threshold proximity of a geolocation of a requesting mobile device in some embodiments.

Figure 5:
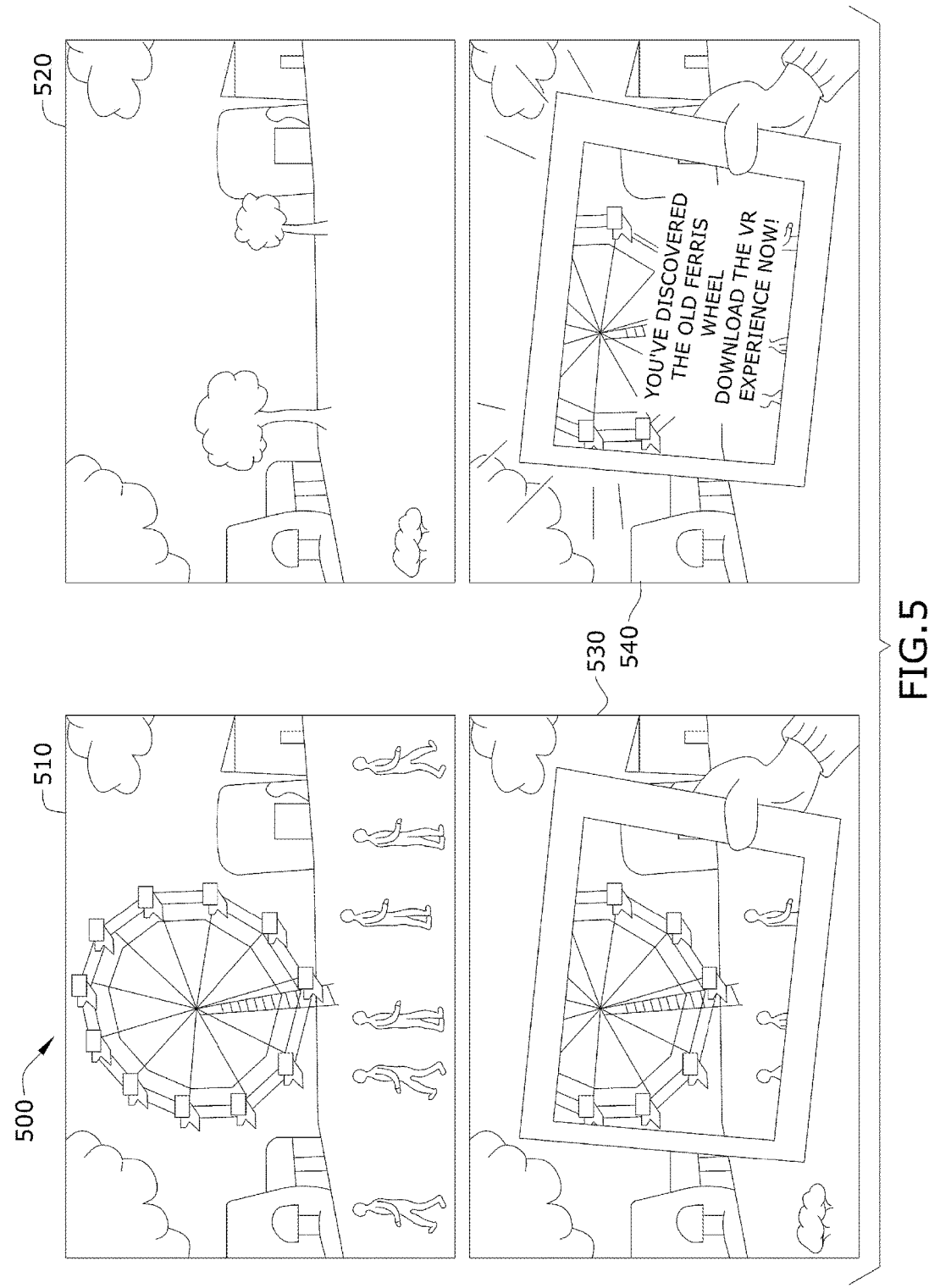

FIG. 5 conceptually illustrates a schematic example diagram of a mobile device discovering a location-based AR/VR simulation of a past attraction at a location within a threshold proximity of a geolocation of the mobile device in some embodiments.

Figure 6:
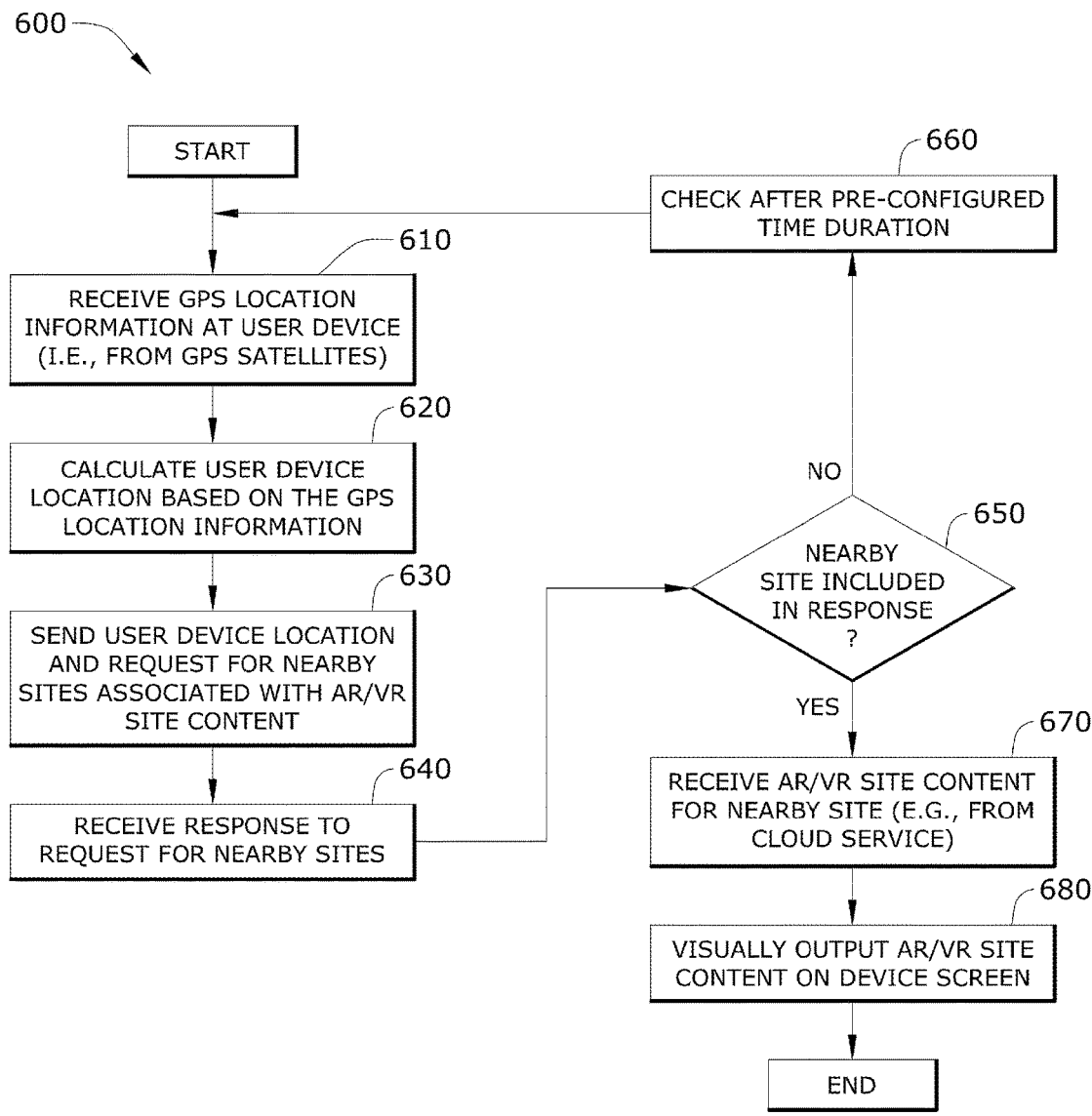

FIG. 6 conceptually illustrates a geolocation-based past attraction discovery request and location-based AR/VR simulation playback process for requesting a server to search for location-based AR/VR simulations of past attractions based on a geolocation of a requesting mobile device in some embodiments.

Figure 7:
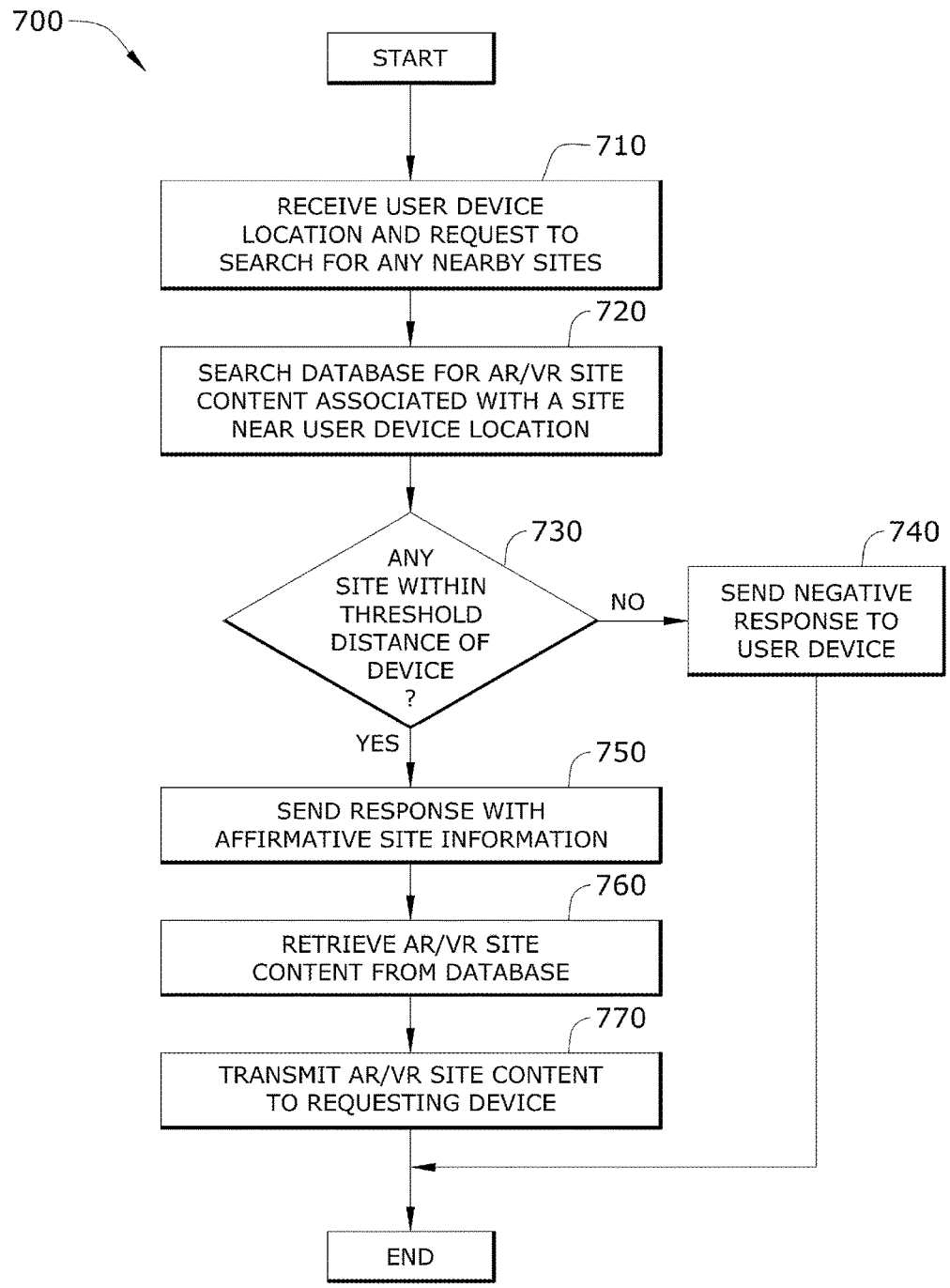

FIG. 7 conceptually illustrates a geolocation-based past attraction server-side discovery process for searching for a location-based AR/VR simulation of a past attraction based on a geolocation of a requesting mobile device in some embodiments.

Figure 8:
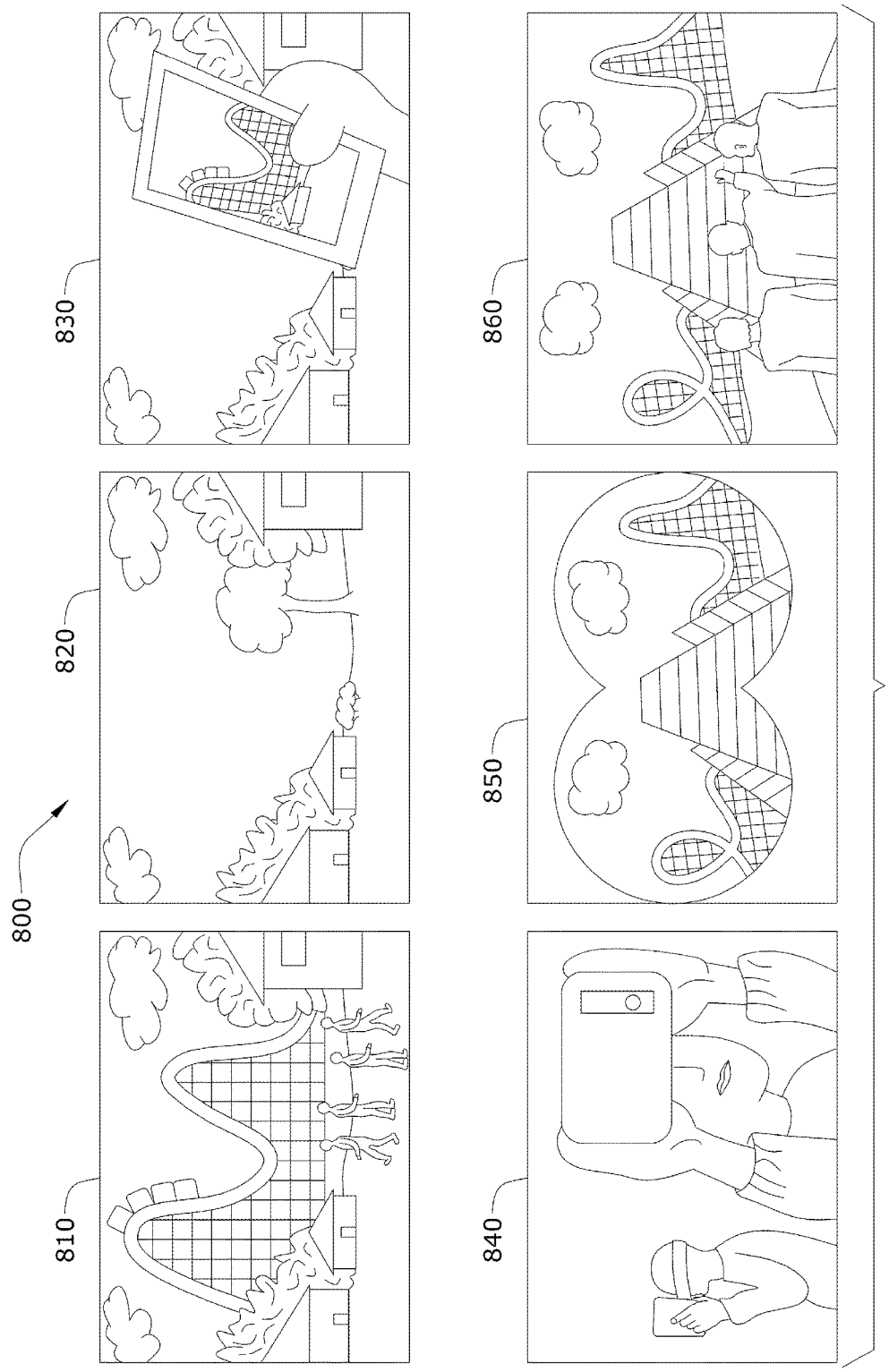

FIG. 8 conceptually illustrates a schematic example diagram of geolocation-based discovery of a past attraction and playback of both an AR simulation of the past attraction and a VR simulation of the past attraction.

Figure 9:
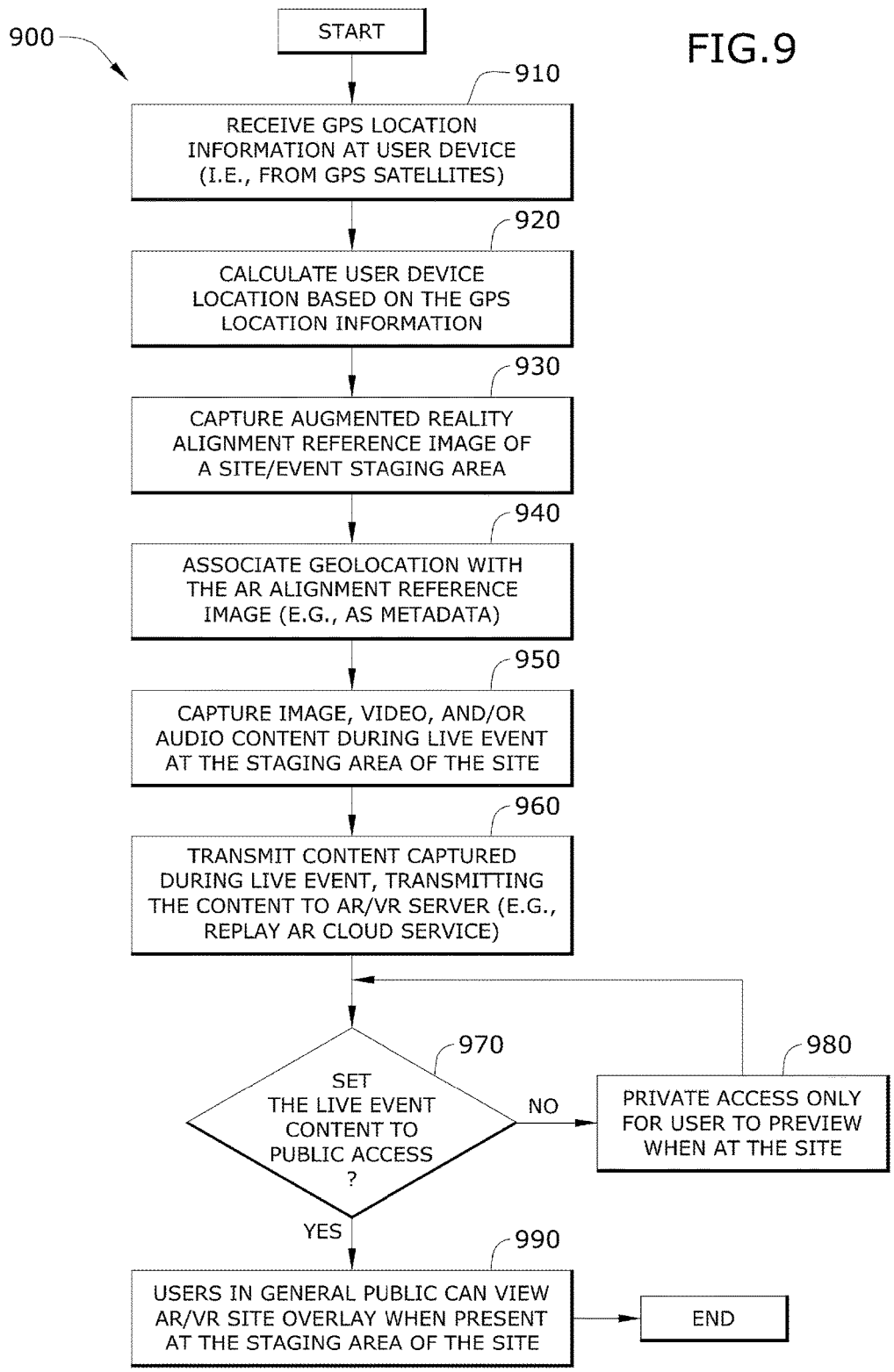

FIG. 9 conceptually illustrates a crowd-sourced location-based attraction preservation process for preserving a present attraction as at least one of a location-based AR simulation of the present attraction and a location-based VR simulation of the present attraction in some embodiments.

Figure 10:
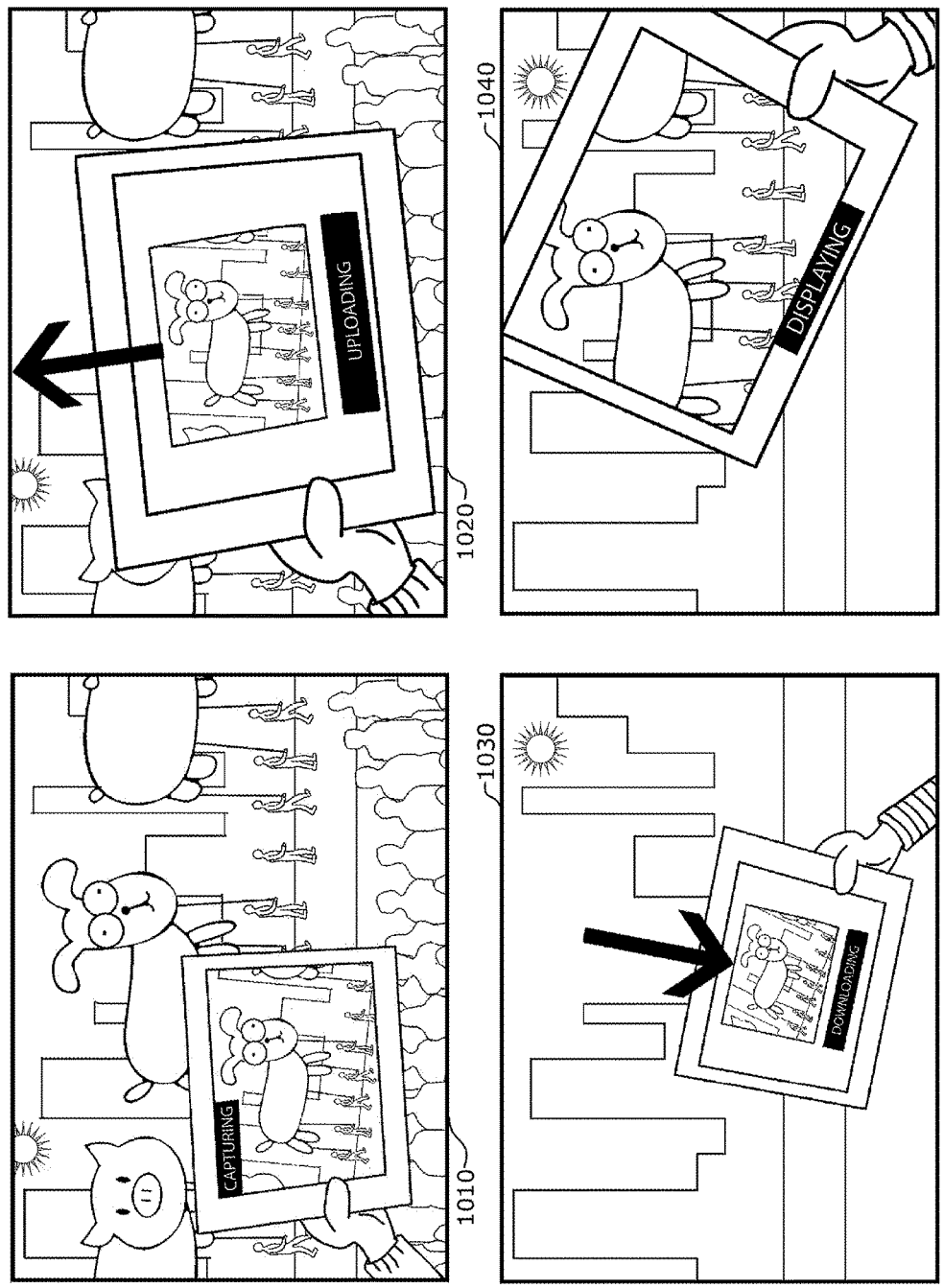

FIG. 10 conceptually illustrates a multi-stage crowd-sourced location-based attraction preservation diagram of a user creating a crowd-sourced location-based AR/VR simulation of a present attraction which is made available to other users to view at a geolocation of the present attraction after the present attraction has finished.

Figure 11:
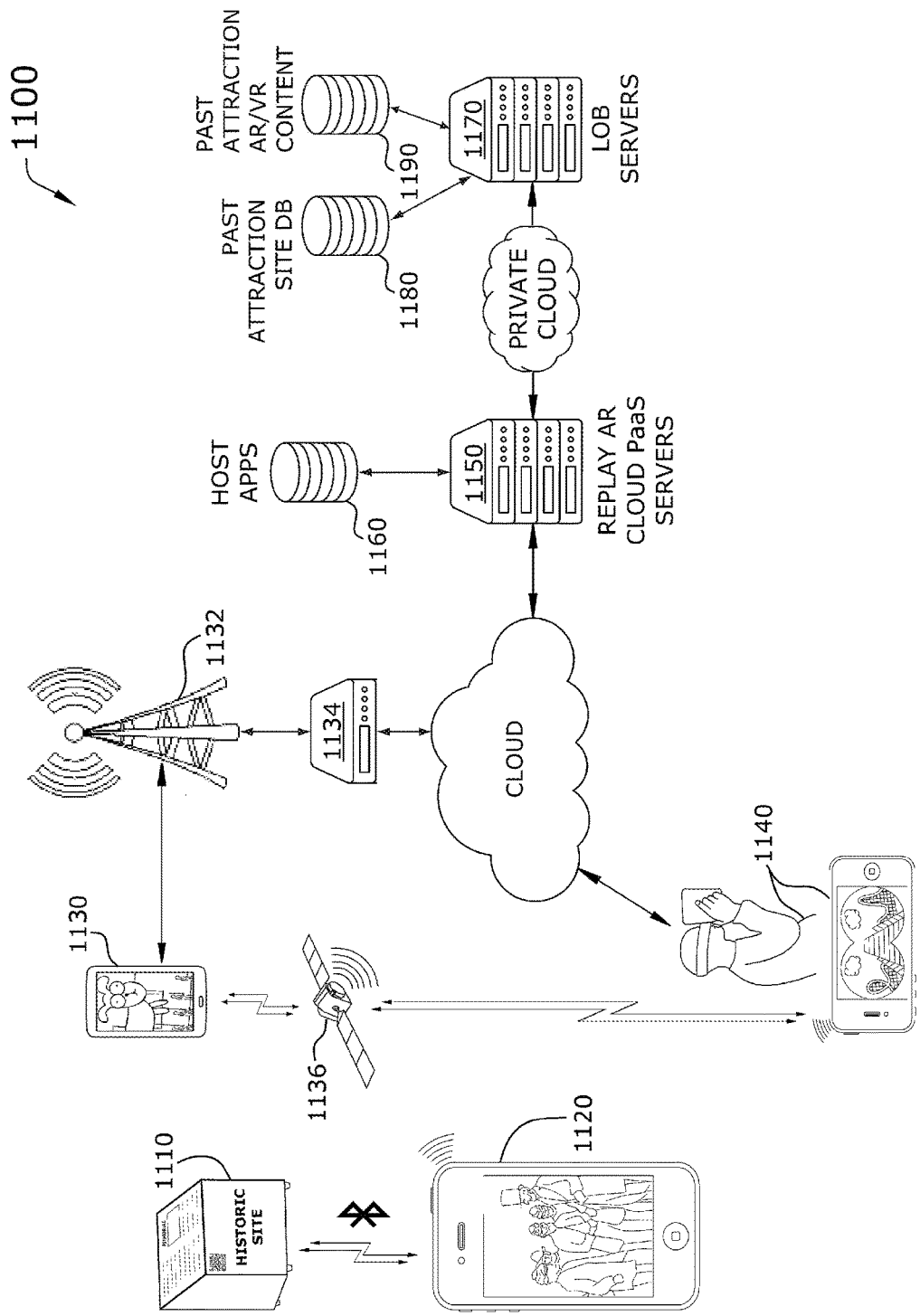

FIG. 11 conceptually illustrates a network architecture of an augmented reality and virtual reality location-based attraction simulation playback and creation system that simulates past attractions and preserves present attractions as location-based augmented reality and virtual reality simulations in some embodiments.

Figure 12:
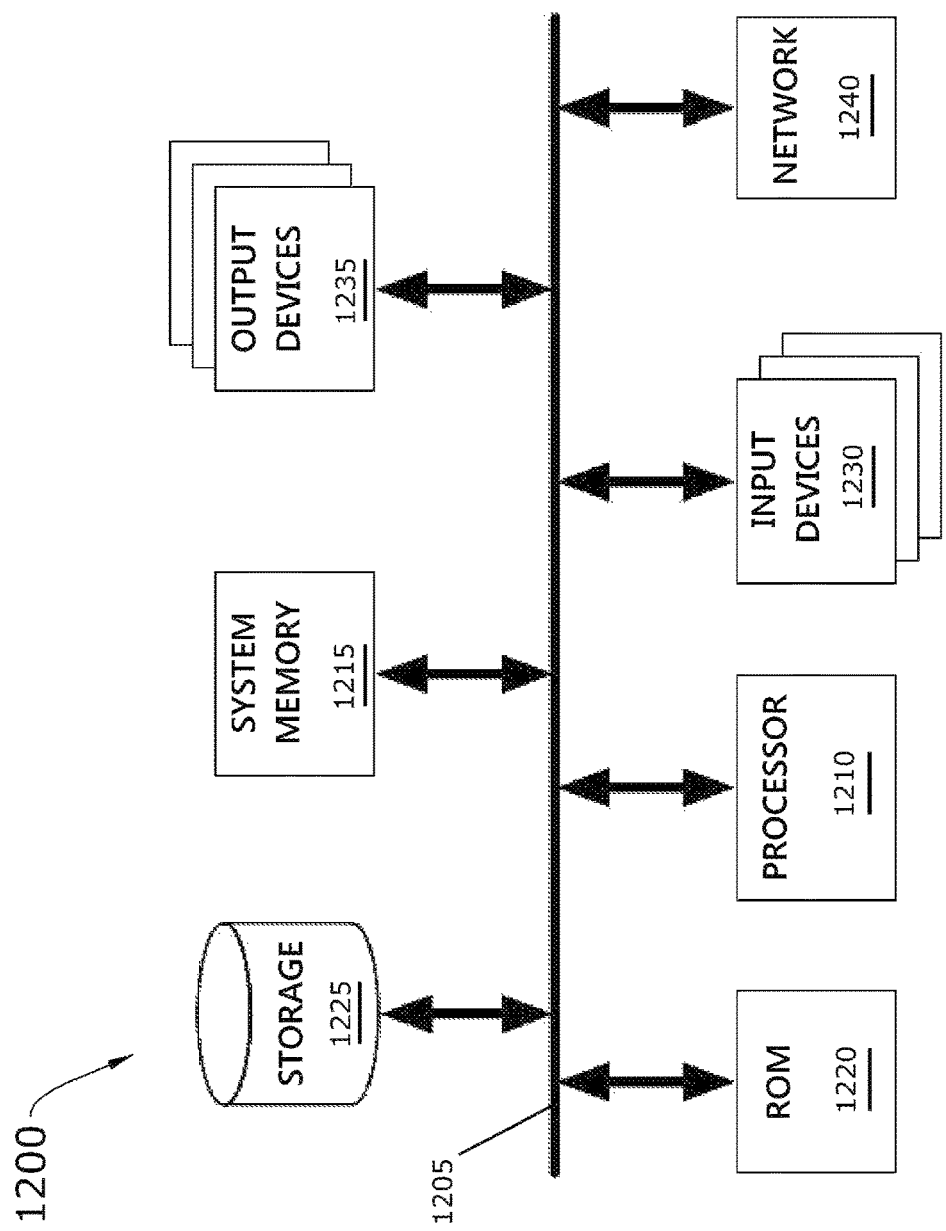

FIG. 12 conceptually illustrates an electronic system with which some embodiments of the invention are implemented.

DETAILED DESCRIPTION

In the following detailed description of the invention, numerous details, examples, and embodiments of a location-based augmented reality (AR), virtual reality (VR), or augmented reality and virtual reality (AR/VR) system that simulates past attractions and preserves present attractions and processes for simulating past attractions and preserving present attractions as location-based AR, VR, or AR/VR attractions are described. In this description certain trademarks, word marks, and/or copyrights are referenced, including Wi-Fi®, which is a registered trademark of Wi-Fi Alliance, and the Bluetooth® word mark and logo, which are registered trademarks owned by Bluetooth SIG, Inc. However, it will be clear and apparent to one skilled in the art that the invention is not limited to the embodiments set forth and that the invention can be adapted to use any present or future wireless communication technology, with or without reference to noted trademarks, word marks, and/or copyrights.

As defined in this specification, "attraction" and "event" are interchangeable terms such that an attraction can mean a location, a thing at a location, an event, and/or an event at a location, and an event can mean an active phenomenon or a location at which the active phenomenon occurs, regardless of where or when the attraction or event occurs. In addition, the term "historical" refers to a past time, such that a past attraction or event can vary from a personal past attraction or event—with great personal significance to an individual but little to no significance to the general public—to a public past attraction or event—with significance to the public at large but without any direct personal significance for anyone. Also defined in this specification, "augmented reality" refers to a semi-artificial environment created through the combination or composition of real-world data (e.g., video data) and computer-generated data, while "virtual reality" refers to a computer-generated environment that, to the person experiencing it, closely resembles reality, such as a realistic simulation of an environment, which may include three-dimensional graphics, by a virtual reality simulator or a computer system using interactive software and hardware.

Some embodiments of the invention include a novel defunct theme park attraction simulation system. In some embodiments, the defunct theme park attraction simulation system includes a theme park attraction and accompanying VR application that simulates recreations of decommissioned amusement or theme park rides and defunct attractions no longer in existence. In some embodiments, the defunct theme park attraction simulation system includes a historical site and event attraction application that simulates recreations of past historical events at historical sites. In some embodiments, the defunct theme park attraction simulation system includes an experience archive data source that provides content designed to simulate the past in ways that provide authentic recreations of popular theme or amusement park attractions from the past that are no longer in service, as well as recreations of historical events.

In some embodiments, the defunct theme park attraction simulation system preserves the first-hand experience of decommissioned theme park rides and attractions using VR technology. Additionally, the defunct theme park attraction simulation system can recreate historical sites or events using augmented reality (AR) technology. In some embodiments, the defunct theme park attraction simulation system uses computer graphics imagery (CGI) recreations and live-action video to preserve and provide access to these first-hand experiences.

By way of example, a user can download an attraction on their mobile device by going to the original site where a ride or attraction once stood, thereby making the quest to collect new rides and attractions a "worldwide scavenger hunt." The attraction can also be seen as it once stood in its original location via the mobile device using AR technology. The AR component also allows users to "see" historical events play out in the exact location where they originally happened.

Embodiments of the defunct theme park attraction simulation system described in this specification differ from and improve upon currently existing options. In particular, some embodiments of the defunct theme park attraction simulation system differ by temporal perspective. While VR technology existing today is primarily deployed in a forward-leaning fashion to create new amusement experiences, the defunct theme park attraction simulation system includes an experience archive data source that provides content designed to simulate the past in ways that provide authentic recreations of popular theme or amusement park attractions from the past that are no longer in service, as well as recreations of historical events.

The defunct theme park attraction simulation system of the present disclosure may be comprised of the following elements. This list of possible constituent elements is intended to be exemplary only and it is not intended that this list be used to limit the defunct theme park attraction simulation system of the present application to just these elements. Persons having ordinary skill in the art relevant to the present disclosure may understand there to be equivalent elements that may be substituted within the present disclosure without changing the essential function or operation of the defunct theme park attraction simulation system.

1. Virtual Reality (VR) Software
2. Virtual Reality (VR) Simulators
3. Computer-Generated Imagery (CGI) and Animation
4. Live-Action Virtual Reality (VR) Camera Rigs
5. Mobile Devices (Smartphones. Tablets, etc.)
6. Virtual Reality (VR) Headsets
7. AR Software
8. Proximity Marketing Technology The various elements of the defunct theme park attraction simulation system of the present disclosure may be related in the following exemplary fashion. It is not intended to limit the scope or nature of the relationships between the various elements and the following examples are presented as illustrative examples only. The defunct theme park attraction simulation system will use CGI to display AR overlays of historical structures and events as well as VR simulations of lost theme park rides and attractions based on original blueprints, photos, video and personal accounts of the original experience. Moving forward, the defunct theme park attraction simulation system will capture live action immersive 3-D VR video of existing rides before they are decommissioned as well as current events to preserve the firsthand experience for future generations. Proximity marketing technology will also allow users to "collect" rides, attractions and events by using an app on their mobile device at the original geographic location where a ride once stood or an event once occurred.

The defunct theme park attraction simulation system of the present disclosure generally works by combining real-world sites with VR simulations. For example, visitors will walk through an enchanted forest of retired theme park rides and artifacts overgrown with exotic flora, and a sculpture garden honoring history's most celebrated park designers. Once inside the ride, guests will be presented with a menu screen from which they can select their ride or attraction. Soon, they are immersed in a VR experience that recreates the complete ride through a realistic 3-D computer-generated simulation based on original plans, photos and footage of the attraction. The audio is a remastered version of the same recording that played when the ride was originally in service. Upon exiting, each guest receives an exclusive code that allows an app on their mobile device to download the VR experience so they can actually take the ride home with them. Guests who continue to ride the Archive can collect a new attraction each time they ride. Finally, a gift shop will offer authentic, tangible pieces of real theme park history ranging from priceless to affordable, as well as reproductions of vintage souvenirs and candy. Outside the archive, guests can also collect rides by going to the original geographic location where a ride once stood. Once nearby, the app will notify the guest that the ride is available for download, making the quest for new rides a "worldwide scavenger hunt." AR software will also allow the user to "see" the ride or attraction as it once stood in its original location, as well as historical events as they unfolded on the site where they originally took place.

To make the defunct theme park attraction simulation system of the present disclosure, one may combine existing and cutting-edge VR simulation technology. Content is provided by CGI recreations and immersive live-action footage taken by VR camera rigs. The content (recreations of theme park rides and attractions no longer in existence) may be experienced by the user through a simulator vehicle, VR headsets and mobile devices via an app.

To use the defunct theme park attraction simulation system of the present disclosure, a user or a guest may download a VR recreation of a former ride or attraction by visiting a physical hub or the original geographic location where a ride once stood. An AR overlay also allows the user to "see" the structure of the attraction as it originally appeared in its active state. Once downloaded, the user can view the VR simulation of a ride or attraction on their mobile device or VR headset.

Additionally, the defunct theme park attraction simulation system can be adapted for use in deployments that preserve historical settings and experiences that have been lost to the ages. For example, while visiting the Boston Harbor, the AR component could allow someone to view the Boston Tea Party as it happened. A user touring Gettysburg could view the Battle of Gettysburg or the Gettysburg Address as it happened in the exact location where it originally took place.

In this specification, there are several descriptions of methods and processes that are implemented as software applications or computer programs which run on computing devices to perform steps of processes for simulating past attractions. However, it should be noted that for the purposes of the embodiments described in this specification, the word "method" is used interchangeably with the word "process". Processes or methods for simulating past attractions are described, therefore, by reference to example methods that conceptually illustrate steps of methods or processes for simulating past attractions.

Several more detailed embodiments are described in the sections below. Section I describes some processes for retrieving past attractions based on a site ID. Section II describes some processes for searching for past attractions based on geolocation. Section III describes requesting and performing past attraction site discovery. Section IV describes crowd-sourced preservation of present and upcoming attractions. Section V describes a network architecture of an attraction AR/VR simulation playback and creation system that simulates past attractions and preserves present attractions. Section VI describes an electronic system that implements one or more of the methods and processes.

I. Retrieving Past Attractions Based on Site ID

By way of example, FIG. 1 conceptually illustrates a site ID-based AR/VR simulation playback process 100 for requesting and receiving a location-based AR/VR simulation of a past attraction based on a site ID at a location associated with the past attraction. In some embodiments, the site ID-based AR/VR simulation playback process 100 is performed by a computing device, such as a mobile computing device or mobile device (e.g., smartphone, tablet computing device, etc.) capable of virtual reality content playback, a mobile audio visual device capable of augmented reality content playback ("AR/VR mask"), or a mobile device used in conjunction with a mobile audio visual device (e.g., "AR/VR goggles"). For example, a user may request and receive a virtual reality (VR) simulation to display on a screen of the mobile device and, upon receiving at least some of the content associated with the VR simulation, begin to play back the VR simulation for the user to see while at the location of the past attraction. Alternatively, the user may employ an AR/VR mask to see the simulated content or the user may combine the mobile device with a pair of AR/VR goggles which are capable of AR/VR playback when used in conjunction.

In some embodiments, the site ID-based AR/VR simulation playback process 100 starts by retrieving (at 110) a unique identifier ("unique ID" or "UID") of a site. For example, a user with a mobile device may scan a QR code displayed on a sign, a placard, a poster, a structure, etc., which is present at a location associated with a past attraction. Alternatively, the user may be prompted to input a code or input ID associated with the location of the past attraction. In other words, one or more past attractions may be associated with the location of the site. The past attraction may be present at the location of the site (albeit in a different form, shape, state of decay, etc.), or the attraction may be defunct, such that the location of the site no longer has the attraction at the site.

Next, the site ID-based AR/VR simulation playback process 100 of some embodiments sends (at 120) the unique site ID and a request for AR/VR site content to a server computing device. The server computing device can be any kind of local or networked server that is capable of receiving a request for content, retrieving the content (if any such content exists), and transmitting the content as a stream of visually outputting content or sending the content in whole to a client-side (user) computing device (e.g., the user's tablet computing device, the user's AR/VR mask, the user's smartphone used in conjunction with AR/VR goggles, etc.).

After sending the unique site ID and requesting the AR/VR site content, the site ID-based AR/VR simulation playback process 100 of some embodiments receives (at 130) the AR/VR site content. For example, the user's mobile device may receive a stream of AR/VR site content from a cloud service hosted by a cloud-based web server computing device or from a local kiosk server that transmits the AR/VR site content via a nearby wireless transmission protocol (e.g., Bluetooth, local WiFi connected to a local server computing device).

While the AR/VR site content is being received (as a stream of AR/VR site content) or after the AR/VR site content is received in full (as a file capable of playback on the user's mobile device), the site ID-based AR/VR simulation playback process 100 of some embodiments visually outputs (at 140) the AR/VR site content on the device screen. For example, if the user has a smartphone, then VR content may be played back on a screen associated with the smartphone, or if the user has an AR/VR mask, playback of the content will be displayed in the mask, or, when the user employs a smartphone in combination with AR/VR goggles, then the AR/VR content stream is played back on the smartphone screen with content visible from the AR/VR goggles. After visually outputting the AR/VR site content, the site ID-based AR/VR simulation playback process 100 ends.

Now turning to another example, FIG. 2 conceptually illustrates a site ID-based replay AR/VR server process 200 for transmitting location-based AR/VR simulation content of a past attraction to a requesting mobile device based on a site ID at a location associated with the past attraction. Unlike the client computing device that performs the site ID-based AR/VR simulation playback process 100, described above by reference to FIG. 1, a server computing device performs the site ID-based replay AR/VR server process 200. In some embodiments, the server computing device is a cloud-based web server computing device that hosts a cloud service for providing AR/VR site content associated with past attractions. In some embodiments, the server computing device is a local server computing device that is associated with a local area network to which the user's computing device may connect via WiFi or Ethernet connection. In some embodiments, the server computing device is a nearby server computing device (which may be enclosed in a kiosk display, a sign, a panel, etc.) which the user's computing device connects to via a short range wireless transmission protocol, such as Bluetooth.

In some embodiments, the site ID-based replay AR/VR server process 200 starts by receiving (at 210) a unique site ID and a request for AR/VR site content from a user computing device. As described above, by reference to FIG. 1 in steps 110 and 120 of the site ID-based AR/VR simulation playback process 100, the unique site ID received by the site ID-based replay AR/VR server process 200 may have been scanned by the user's mobile device and transmitted along with a request for the AR/VR site content, or may have been input by the user of the mobile device and transmitted to the server along with the request for the AR/VR site content.

Next, the site ID-based replay AR/VR server process 200 of some embodiments retrieves (at 220) the AR/VR site content from a database that stores AR site content and/or VR site content, along with other static site content (such as images, textual passages, quotes, headlines, etc.). In some embodiments, the site ID-based replay AR/VR server process 200 retrieves the AR/VR site content by providing the unique site ID in a query to the database, and retrieving AR/VR content with a matching site ID. In some embodiments, the database is a cloud database in communicable connection with a cloud web server. In some embodiments, the database is associated with a database management system (DBMS) deployed on a local area network (LAN). In some embodiments, the database is a local computing device resource accessible from the server computing device (e.g., as may be the case for a stand-alone kiosk with a server for delivering the AR/VR site content).

After retrieving the AR/VR site content from the database, the site ID-based replay AR/VR server process 200 of some embodiments transmits (at 230) the AR/VR site content to the requesting computing device. For example, the server may start to transmit a stream of the AR/VR site content to the user's smartphone or enhanced reality visual playback device. After the AR/VR site content is finished transmitting to the user device (or after the user device cancels the transmission of the AR/VR site content), the site ID-based replay AR/VR server process 200 ends.

Putting the two processes 100 and 200 above into perspective, FIG. 3 conceptually illustrates a schematic example diagram 300 over three frames—a first frame 310 of a past attraction site, a second frame 320 of a location-based virtual reality (VR) simulation of the past attraction, and a third frame 330 of a location-based augmented reality (AR) simulation of the past attraction—of site ID-based AR/VR location-based simulation playback as both a location-based AR simulation and a location-based VR simulation of a past attraction associated with the site ID when a user is at a geolocation of the past attraction.

As shown in this figure, the first frame 310 includes a sign with information about a past attraction. The sign provides a typical representation of a historical site as was common through decades. In this case, the past attraction at the site is associated with the Gettysburg Address of Nov. 19, 1863, at a location in Pennsylvania of the Battle of Gettysburg. An encoded QR code is shown on the sign, which can be scanned by a mobile device to retrieve either or both of the location-based AR simulation of the past attraction and the location-based VR simulation of the past attraction. In the second frame 320 and the third frame 330, President Lincoln is shown speaking with Union soldiers around the time of the Gettysburg Address. In some embodiments, an image is displayed on the user's mobile device when the unique site ID is scanned. Then, if the user chooses to retrieve the location-based AR simulation or the location-based VR simulation content for the site, a server (e.g., local server or cloud server) can begin a stream or transmission of the selected simulation (either the location-based AR simulation or the location-based VR simulation). In this schematic example 300, the second frame 320 shows the location-based VR simulation of the site because the displayed simulation is immersive, not showing any of the present scenery (i.e., does not show the past attraction sign which is physically present at the Gettysburg Address location). On the other hand, the third frame 330 shows the location-based AR simulation of the Gettysburg Address site. The location-based AR simulation is exhibited in the third frame 330 as demonstrated by the background scenery shown in the visual output of the simulation. Specifically, the sign for the historical attraction is shown in the third frame 330. Thus, the user is able to choose either one of these location-based simulations for playback. In addition, it is possible for the user to select both the location-based AR simulation and the location-based VR simulation of the past attraction, and the selections can be in any order.

II. Searching for Past Attractions Based on Geolocation

While the examples above describe site ID-based identification of past attraction sites (i.e., where a unique site code is scanned, such as a QR code, or input, such as an alpha-numeric code, and a corresponding past attraction site is identified based on the code), some embodiments identify past attraction sites by calculating a physical location (or geolocation) of a mobile device user and then checking whether the geolocation is nearby any past attraction with a corresponding AR/VR site simulation.

By way of example, FIG. 4 conceptually illustrates a geolocation-based past attraction look-up table (LUT) discovery and location-based AR/VR simulation playback process 400 for discovering a site ID and a location-based AR/VR simulation of a past attraction at a location within a threshold proximity of a geolocation of a requesting mobile device. In contrast to the site ID-based processes described above by reference to FIGS. 1 and 2, the geolocation-based past attraction LUT discovery and location-based AR/VR simulation playback process 400 described by reference to FIG. 4 calculates a physical location (or "geolocation") of a user's mobile device and performs a discovery search of a locally-stored look-up table (e.g., a file stored on the mobile device) to determine whether there are any AR/VR simulations of past attractions near the geolocation of the mobile device. By using geolocation of the mobile device, the user does not need to scan a QR code or any other kind of unique site ID code in order to obtain a site ID for retrieval and playback of location-based AR/VR simulations of past attractions.

For purposes of explanation, and so as to not obscure the drawings and description with unnecessary detail, the geolocation-based past attraction LUT discovery and location-based AR/VR simulation playback process 400 described by reference to FIG. 4 focuses on GPS-based determination of the user's geolocation. However, a person skilled in the art would appreciate how the geolocation-based past attraction LUT discovery and location-based AR/VR simulation playback process 400 could apply any of the several well-known methods for determining a physical location without changing the steps or overall functions of the steps in the process 400. Thus, obtaining the mobile device's geolocation can be accomplished by calculating Earth position by any of several well-known techniques including, without limitation, calculation based on a global positioning system (GPS) in which location data is received at the mobile device from multiple GPS satellites, cellular base tower location calculation, triangulation, etc. Also, it is noted here that for purposes of all examples, descriptions, processes, methods, systems, and other details of the embodiments described in this specification, the manner of obtaining a device's geolocation is similar to or the same as that described here.

In some embodiments, the geolocation-based past attraction LUT discovery and location-based AR/VR simulation playback process 400 receives (at 410) GPS location data at the user's mobile device from multiple GPS satellites. Next, the geolocation-based past attraction LUT discovery and location-based AR/VR simulation playback process 400 calculates (at 420) the location (or geolocation) of the user's mobile device based on the received GPS location data from the multiple GPS satellites. After the geolocation of the user's mobile device is determined, the geolocation-based past attraction LUT discovery and location-based AR/VR simulation playback process 400 of some embodiments searches (at 430) through a locally stored site location data file. (The site location data file may also be referred to as a look-up-table (LUT), site location LUT, or simply LUT). The site location LUT in this example may be stored locally on the mobile device of the user on persistent data storage media (e.g., a persistent data storage media device that is either permanent, such as a hard disk storage of the mobile device, or removable, such as a removable SD memory card). In other instances, the site location LUT may be stored in a cloud database that is accessible to the mobile device of the user (e.g., the user has established an account with a provider of augmented reality and/or virtual reality simulations of past attractions, and is able to access a common or user-specific site location LUT in a cloud database space associated with the user's account). Furthermore, the geolocation-based past attraction LUT discovery and location-based AR/VR simulation playback process 400 of some embodiments includes steps for loading the site location LUT into at least one of a memory space and random access memory buffers of the user's mobile device. Therefore, in some embodiments, the geolocation-based past attraction LUT discovery and location-based AR/VR simulation playback process 400 may include steps for directly reading (and thereby searching) the site location LUT in memory (e.g., when the site location LUT is already loaded into memory of the mobile device).

Thus, the geolocation-based past attraction LUT discovery and location-based AR/VR simulation playback process 400 searches the site location LUT for the nearest site (closest to the user as determined by the geolocation of the user's mobile device) with a past attraction (and which is associated with an existing AR/VR simulation of the past attraction). However, in some embodiments, the geolocation-based past attraction LUT discovery and location-based AR/VR simulation playback process 400 determines (at 440) whether the nearest site is within a threshold distance of the user's mobile device. In some embodiments, each AR/VR simulation of a past attraction includes a set of meta-data specifying a maximum distance from which the AR/VR simulation may be set of playback on the user's device. As such, all of the AR/VR simulations may have different maximum playback distances specified. For example, playback of an AR/VR simulation of the Gettysburg Address may be allowed when the user is within 100 meters of the location from which Abraham Lincoln spoke, while playback of an AR/VR simulation of a large defunct amusement park ride (such as a roller coaster) may be allowed when the user is within 500 meters of the location at which the amusement park ride existed or playback of an AR/VR simulation of the Battle of Gettysburg may be permitted when the user is within 750 meters of a bounded perimeter surrounding the place where the battle is understood to have occurred.

When the geolocation-based past attraction LUT discovery and location-based AR/VR simulation playback process 400 determines (at 440) that the mobile device of the user is not within a threshold distance of a nearby site of a past attraction, then the process 400 waits to check again (at 450) after a pre-configured time duration. For example, the mobile app which implements the process may perform searches of the site location LUT every minute (using the most recent GPS location data to calculate the geolocation of the user every minute), or every second, or some other configurable time duration. Following this, the geolocation-based past attraction LUT discovery and location-based AR/VR simulation playback process 400 returns to step 410 to receive the GPS location information and calculate the user's geolocation, as described above.

On the other hand, when the mobile device of the user is determined to be within a threshold distance of a nearby site of a past attraction, then the geolocation-based past attraction LUT discovery and location-based AR/VR simulation playback process 400 retrieves (at 460) the unique site ID of the nearby site from the site location LUT. In some embodiments, the geolocation-based past attraction LUT discovery and location-based AR/VR simulation playback process 400 automatically retrieves the unique site ID of the nearest site when there are multiple nearby sites found to be within the respective threshold distance of the user's mobile device.

In some embodiments, the geolocation-based past attraction LUT discovery and location-based AR/VR simulation playback process 400 retrieves the unique site IDs of any and all nearby sites when there are multiple nearby sites found to be within their respective threshold distance of the user's mobile device. When such a scenario arises, the geolocation-based past attraction LUT discovery and location-based AR/VR simulation playback process 400 of some embodiments alerts the user (via the user's mobile device) of the existence of the multiple nearby sites. For example, a mobile app that implements the geolocation-based past attraction LUT discovery and location-based AR/VR simulation playback process 400 and is running on the user's mobile device may be configured to flash a message or send a notification to inform the user that multiple past attraction sites were discovered nearby, based on the threshold distance settings.

Alternatively, some embodiments of the geolocation-based past attraction LUT discovery and location-based AR/VR simulation playback process 400 only determine (at 440) whether the mobile device of the user is within an all-encompassing threshold distance from the mobile device. For example, a mobile app which implements the geolocation-based past attraction LUT discovery and location-based AR/VR simulation playback process 400 may be configured to have a threshold distance of one kilometer (1000 meters) and to inform the user of multiple nearby past attraction sites that are one kilometer or less away from the user's present geolocation. In some embodiments, the mobile app can give the user directions to any of the multiple nearby past attraction sites, when, for example, a particular nearby past attraction site is chosen by the user. Furthermore, the mobile app may be configured to provide similar informational alerts or notifications and directions/guidance options when the relative distances away from the user of two or more past attraction sites are approximately the same distance. For example, if an AR/VR simulation exists for the construction of the Washington Monument and for construction of the United States Senate building, in Washington D.C., then when a user is standing in the middle of the National Mall (which separates the Washington Monument and the United States Senate building), the geolocation-based past attraction LUT discovery and location-based AR/VR simulation playback process 400 may search the site location LUT and find the Washington Monument and the United States Senate building approximately the same distance from the user, and thereafter will inform or notify the user of the existence of both nearby past attraction sites, as well as provide directions and/or guidance for traversing a course to one or both of the sites.

Whether a past attraction site is found to be the nearest site or a single past attraction site among multiple nearby past attraction sites is selected by the user, the geolocation-based past attraction LUT discovery and location-based AR/VR simulation playback process 400 of some embodiments sends (at 470) the corresponding unique site ID and a request for AR/VR site simulation content to the server. The AR/VR site simulation content can be a simulation, multiple simulations, an augmented reality application with audio, video, and/or textual content, and/or a virtual reality application with associated audio, text, computer graphics imagery (CGI)-based animations, and/or immersive video content. As noted above, the server may be a local server (e.g., a server computing device in a kiosk display), a local network server (e.g., accessible from a local area network (LAN) or local hotspot), or a cloud server (e.g., accessible over a public network, such as the Internet).

Next, the geolocation-based past attraction LUT discovery and location-based AR/VR simulation playback process 400 of some embodiments receives (at 480) the AR/VR site simulation content from the server. For example, digital still images may be received along with textual information, and an augmented reality or virtual reality simulation video may start streaming to the user's device from a cloud server that hosts a past attraction AR/VR simulation cloud service. In some embodiments, after receiving some or all of the AR/VR site simulation content, the geolocation-based past attraction LUT discovery and location-based AR/VR simulation playback process 400 visually outputs (at 490) the AR/VR site simulation content to the display screen of the user's mobile device. In some embodiments, when the user's mobile device is a VR mask or VR goggles suitable for displaying virtual reality or augmented reality content, the geolocation-based past attraction LUT discovery and location-based AR/VR simulation playback process 400 outputs the AR/VR site simulation content to the associated visual output component. Then the process 400 ends.

Although the geolocation-based past attraction LUT discovery and location-based AR/VR simulation playback process 400 searches for existing past attraction sites in the site location LUT, in some embodiments the geolocation-based past attraction LUT discovery and location-based AR/VR simulation playback process 400 allows the user to preserve a site which presently does not exist as an AR/VR simulation site. For example, the user may be physically present at a geolocation of a past attraction which presently has no available AR/VR site simulation content for playback. In some embodiments, the geolocation-based past attraction LUT discovery and location-based AR/VR simulation playback process 400 is adapted at step 450 to allow a user to select an option to preserve AR/VR site simulation content in association with the present geolocation and associated attraction site. A process for preserving attractions as crowd-sourced AR/VR simulations is described in greater detail below, by reference to FIG. 9.

Now turning to another example, FIG. 5 conceptually illustrates a schematic example diagram 500, over four frames 510-540, of a mobile device discovering a location-based AR/VR simulation of a past attraction at a location within a threshold proximity of a geolocation of the mobile device. Specifically, a first frame 510 shows a past attraction of an old Ferris wheel in a lively area with people walking around. In contrast, the old Ferris wheel is not shown in a second frame 520, and the area is less lively, showing trees and bushes where there were people in the first frame 510. As can be deduced, the first frame 510 illustrates the past attraction as one may have encountered it while the old Ferris wheel was an active amusement park ride, while the second frame 520 illustrates the present location of the past attraction (which is the defunct Ferris wheel).

Turning to a third frame 530, a user is shown holding a mobile tablet computing device with an image of the old Ferris wheel displayed on the tablet's screen approximately where it existed when it was an active ride. Behind and to the sides of the tablet computing device, the present day location of the past attraction is visible. As can be understood in context of the process 400, the user is presently at the location of a past attraction, and the tablet computing device is running a mobile app that determines location of the user and identifies nearby past attractions. In this case, the old Ferris wheel is identified and a virtual reality (VR) simulation of the old Ferris wheel is available for playback. Thus, in a fourth frame 540, the tablet computing device is shown visually outputting the image of the old Ferris wheel with informational text superimposed over the image (i.e., "YOU'VE DISCOVERED THE OLD FERRIS WHEEL, DOWNLOAD THE VR EXPERIENCE NOW!").

If the VR simulation of the old Ferris wheel in this example had been a location-based augmented reality (AR) simulation of the old Ferris wheel, then playback of the location-based AR simulation would include scenery from the present landscape, such as the trees and bushes shown in the second frame 520, with the old Ferris wheel blended into the scene approximately at its past resting location. Also, while there may also be a location-based augmented reality (AR) simulation of the old Ferris wheel available for the user to view, it may be the case that a past attraction is presently only associated with one type of location-based simulation (either VR or AR), or neither VR or AR simulations (e.g., just a set of images to view, text to read, and/or audio to listen to, etc.).

III. Requesting and Performing Past Attraction Site Discovery

In some embodiments, past attraction site discovery is performed by the server after the user mobile device sends a geolocation and request for discovery of any location-based AR/VR site simulation content corresponding to the geolocation of the user's mobile device.

From the client-side of the user's mobile device, FIG. 6 conceptually illustrates a geolocation-based past attraction discovery request and location-based AR/VR simulation playback process 600 for requesting a server to search for location-based AR/VR simulations of past attractions based on a geolocation of a requesting mobile device. As shown in this figure, the geolocation-based past attraction discovery request and location-based AR/VR simulation playback process 600 starts by receiving (at 610) GPS location information at the user's device. Next, the geolocation-based past attraction discovery request and location-based AR/VR simulation playback process 600 calculates (at 620) the location of the user's device based on the GPS information. For example, the user's mobile device may receive GPS location data from multiple GPS satellites and then calculate a geolocation on Earth for the present location of the mobile device. Typically, location data from three to four GPS satellites is used to calculate an Earth-based geolocation of a mobile device user.

In some embodiments, the geolocation-based past attraction discovery request and location-based AR/VR simulation playback process 600 then sends (at 630) the geolocation of the mobile device and a request for nearby past attraction sites (which are associated with corresponding location-based AR/VR site content). For example, the mobile device of the user sends the geolocation and request to a cloud server that hosts a past attraction AR/VR simulation service. Next, the geolocation-based past attraction discovery request and location-based AR/VR simulation playback process 600 receives (at 640) a response to the request for nearby past attraction sites.

Based on the received response, the geolocation-based past attraction discovery request and location-based AR/VR simulation playback process 600 of some embodiments determines (at 650) whether a nearby past attraction site is included with the response. For example, the response may include a link to a past attraction site AR/VR simulation. When no nearby past attraction site is included in the response, then the geolocation-based past attraction discovery request and location-based AR/VR simulation playback process 600 proceeds to check (at 660) after a pre-configured time duration. In other words, the geolocation-based past attraction discovery request and location-based AR/VR simulation playback process 600 continually checks for past attraction sites based on updated geolocation of the user.

On the other hand, when a nearby past attraction site is included in the response, then the geolocation-based past attraction discovery request and location-based AR/VR simulation playback process 600 receives (at 670) the location-based AR/VR site simulation content corresponding to the nearby site in the response. For example, the geolocation-based past attraction discovery request and location-based AR/VR simulation playback process 600 receives the location-based AR/VR simulation from a cloud service.

Finally, the geolocation-based past attraction discovery request and location-based AR/VR simulation playback process 600 visually outputs (at 680) the location-based AR/VR site simulation content to the user's mobile device screen, display, or other visual output hardware component. Then the geolocation-based past attraction discovery request and location-based AR/VR simulation playback process 600 ends.

A corresponding process is described next, by reference to FIG. 7, which conceptually illustrates a geolocation-based past attraction server-side discovery process 700 for searching for a location-based AR/VR simulation of a past attraction based on a geolocation of a requesting mobile device. As shown in this figure, the geolocation-based past attraction server-side discovery process 700 starts by receiving (at 710) a geolocation and a past attraction discovery request. The geolocation is the present physical location of a user's mobile device, as calculated, for example, by GPS location data received at the mobile device from multiple GPS satellites. The past attraction discovery request is sent from the user's mobile device to prompt the server to search for any past attraction sites which are nearby the mobile device. In some embodiments, the geolocation-based past attraction server-side discovery process 700 then searches (at 720) the database for past attraction sites which have corresponding AR/VR simulation content and are nearby the geolocation of the mobile device of the user.

Next, the geolocation-based past attraction server-side discovery process 700 determines (at 730) whether there is any past attraction site within a threshold distance of the geolocation of the user's mobile device. The threshold distance, as noted above, may be a user-configurable distance and/or a distance based on the type of attraction (whether it should be viewed closely or can be sufficiently viewed from a distance), a preferred AR/VR simulation playback distance range, or a default distance setting which is used when the user does not configure or set the distance.

When there is no past attraction site within the threshold distance, then the geolocation-based past attraction server-side discovery process 700 of some embodiments sends (at 740) a negative response to the user's mobile device. The negative response, when received at the user's mobile device, allows the user's mobile device to wait for an amount of time before requesting past attraction discovery again. The negative response can be a programmatic message which is undetectable to the user (e.g., a mobile app that implements the process can simply request discovery of past attraction sites at a later time after receiving a negative response) or can include a graphical component to inform the user that no past attraction site is nearby (e.g., via a graphical user interface (GUI) that is visually output on the mobile device with information about the negative response to the request for discovery of nearby past attraction sites). After sending the negative response to the mobile device of the user, the geolocation-based past attraction server-side discovery process 700 ends.

On the other hand, when there is a past attraction site determined to be within the threshold distance of the user's mobile device, then the geolocation-based past attraction server-side discovery process 700 sends (at 750) an affirmative response to the user's mobile device with information about the past attraction site. Following the affirmative response, the geolocation-based past attraction server-side discovery process 700 of some embodiments retrieves (at 760) AR/VR site simulation content from the database. In some embodiments, the geolocation-based past attraction server-side discovery process 700 then transmits (at 770) the AR/VR site simulation content to the requesting mobile device of the user. For example, the geolocation-based past attraction server-side discovery process 700 may start streaming the data of the AR/VR site simulation content for the user to be able to start playback of the AR/VR simulation via the mobile device. After the AR/VR site simulation content has been transmitted to the user's mobile device (or after the user has canceled the data transmission), then the geolocation-based past attraction server-side discovery process 700 ends.

By way of example, FIG. 8 conceptually illustrates a schematic example diagram 800, over six frames 810-860, of geolocation-based discovery of a past attraction and playback of both a location-based AR simulation of the past attraction and a location-based VR simulation of the past attraction. Specifically, a first frame 810 shows a past attraction of an old roller coaster in an area with some people walking around (such as amusement park visitors). However, in this example, the old roller coaster is a defunct ride with no physical existence any longer. Thus, the old roller coaster is not shown in a second frame 820. In a third frame 830, a user is shown holding a mobile tablet computing device with an image of the old roller coaster displayed on the tablet's screen approximately where it existed when it was an active ride, having 'found' the past attraction (i.e., the old roller coaster) due to the physical proximity of the user to the location where the old roller coaster used to stand.

In some embodiments, when the user discovers a past attraction with a mobile device, the user may choose playback of a location-based augmented reality or virtual reality simulation of the past attraction. In the third frame 830, a location-based augmented reality (AR) simulation of the old roller coaster is shown. To enable the location-based AR simulation, the mobile device of the user would need to be set with the on-board video camera to be showing (or even capturing video of) the surrounding area. Then, when the user of the mobile device starts playback, the location-based AR simulation content will appear to be present in the real existing world. That is, once AR playback has started, the location-based AR simulation content would be visually output onto the display screen of the user's device as a semi-artificial environment, showing up as a partial layer of the old roller coaster at its old location, but with the real world trees and houses presently shown also appearing on the device screen. In this manner, the simulation of the roller coaster is augmenting the present reality of the location in and around the old roller coaster, thereby providing a semi-artificial environment to anyone who views the location-based AR simulation which lends perspective as to how the old roller coaster would appear had it never been removed.

In some embodiments, the mobile device of the user is combined with goggles or a mask that is capable of enhancing the visual output of a location-based AR/VR site simulation, to such a degree that a user wearing the mask or goggles (in combination with the mobile device) feels present at the location shown by the simulation content. This is a virtual reality representation of a past attraction. In the example simulation shown in frames 840-850, the location of the simulation is the place of the old roller coaster, but the mobile device users are wearing VR masks in order to experience the old roller coaster in an almost realistic sense. Similarly, a user could experience a VR representation of riding the old roller coaster in a more traditional, physical VR ride simulator, instead of using VR goggles or a VR mask. Such a traditional, physical VR ride simulation of the old roller coaster is demonstrated in the last frame 860. In all of the VR simulation frames 840-860, all of the old scenery surrounding the old roller coaster would also be experienced during playback of the location-based VR simulation of the old roller coaster by the users wearing VR masks or enjoying the experience in a physical VR ride simulator. VR mask-based experiences are shown in FIG. 8, specifically, in a fourth frame 840 with the users donning their VR masks and in a fifth frame 850 with a representative view inside one of the VR masks. Also, a physical VR ride simulation experience is demonstrated in FIG. 8, in a sixth frame 860 which provides an appearance of being on the old roller coaster as it is operating, with people in a roller coaster car ahead of the user (as would have been seen at the time the footage of the old roller coaster was captured, or in the manner a historian would have expected people to behave, dress, speak, and appear at the time the old roller coaster was in operation).

In particular, in the fourth frame 840, users are shown with mobile devices attached to headgear for location-based AR/VR site simulation playback. In this way, when the user mobile devices receive the location-based VR simulation playback content from the past attraction AR/VR simulation cloud service, the users are able to directly view the content, without having to establish communication connections between a mobile device and a VR mask.

As mentioned above, a view of the old roller coaster is shown in the fifth frame 850 from the perspective of a person riding the old roller coaster. While the user who is viewing the location-based VR simulation of the old roller coaster is not actually riding the old roller coaster, the visual experience being shown and perceived is a first-person point of view experience in which the user perceives how it appears to actually ride the old roller coaster (it seems real).

Rounding out the frames in FIG. 8, a fully immersive location-based virtual reality (VR) view is shown in the sixth frame 860, making the appearances of other riders on the old roller coaster seem authentic and real to the user. The example shown in the sixth frame 860 demonstrates a type of traditional, physical VR ride simulator experience a user may experience of the old roller coaster.

While the frames shown in FIG. 8 first demonstrated a location-based augmented reality (AR) simulation view of the old roller coaster and then demonstrated a location-based virtual reality (VR) simulation of the old roller coaster, it should be understood that in some embodiments the user has a choice to make between the location-based AR and VR simulation content, but is able to switch from one to the other at any time during, before, or after a simulation replay. In some cases, the user will be presented with only one of the simulation content types, either augmented reality or virtual reality. In those cases, the user can either choose to replay the simulation or not. In still other cases, the user will have more options, including selections to view textual information, listen to audio content, or view other content related to the past attraction. In some cases, the user may be presented with viewing options that include a traditional, physical VR simulator, with directions to and information about using the physical VR simulator to experience the past attraction. On the other hand, some past attractions will only have limited content available for playback. For instance, some past attractions may have an image-based simulation of a past attraction, whereby older and more recent digital photographs are scrolled through in a sort of simulated play of the past attraction. Thus, the ability to view old past attractions is limited by the technology of the day, while the ability to create crowd-sourced location-based AR/VR simulations may be expanded in ways that touch on other sensory perceptions (e.g., taste, smell, feeling, etc.)

IV. Crowd-Sourced Preservation of Present and Upcoming Attractions

The descriptions of inventive embodiments and examples have, to this point, focused in large part on searching for past attractions, retrieving existing location-based AR/VR site simulations of discovered nearby past attractions, and viewing (or playing back) the existing location-based AR/VR site simulations. However, some embodiments include processes for preserving present or upcoming attractions which may not have any associated location-based AR/VR site simulation content, or which have some location-based AR/VR site simulation content, but other users wish to provide additional or alternative location-based AR/VR simulation content for the attraction.

By way of example, FIG. 9 conceptually illustrates a crowd-sourced location-based attraction preservation process 900 for preserving a present attraction as at least one of a location-based AR simulation of the present attraction and a location-based VR simulation of the present attraction. In describing the crowd-sourced location-based attraction preservation process 900, a multi-stage crowd-sourced location-based attraction preservation diagram is explained, by reference to FIG. 10, to demonstrate how a person (or "user") may preserve an existing or upcoming attraction for future location-based AR/VR simulated viewing and playback. Therefore, the descriptions pertaining to several steps of the crowd-sourced location-based attraction preservation process 900 are interleaved with descriptions of the multi-stage crowd-sourced location-based attraction preservation diagram illustrated in and described by reference to FIG. 10.

Referring initially to FIG. 9, the crowd-sourced location-based attraction preservation process 900 starts by receiving (at 910) GPS location information from multiple GPS satellites at a mobile device of a user. For example, the GPS location information from three or four GPS satellites may be received at the user's smartphone or tablet computing device. Next, the crowd-sourced location-based attraction preservation process 900 calculates (at 920) a physical location of the user's mobile device based on the GPS location information.

Unlike the processes for discovering, retrieving, and playing back past attraction AR/VR site simulations, there are some steps in the crowd-sourced location-based attraction preservation process 900 for preparing to preserve an existing site as an AR/VR site simulation. Thus, in some embodiments, the crowd-sourced location-based attraction preservation process 900 captures (at 930) an alignment reference image of a particular site or event staging area. For example, a user may take an image of a street along which a parade will march, an image of a parade banner, an image of the start of the parade, or any other image that may visually represent the content the user plans to capture and preserve. Although the crowd-sourced location-based attraction preservation process 900 includes a step for capturing an alignment reference image before capturing actual AR/VR related content, in some embodiments, a reference image is chosen from a sequence of video frames or an image captured of the actual attraction. For example, the user may select a single video frame image from a sequence of video frames of the actual parade captured by a video capture device (camera) of the user's mobile device. In such instances, the step for receiving an alignment reference image is skipped and a corresponding step is performed after the content of the attraction is captured, thereby ensuring that at least one reference image can be associated with the content to be used in generating the AR/VR simulation of the attraction.

In some embodiments, the crowd-sourced location-based attraction preservation process 900 is implemented as a mobile app that includes an image capture event listener module that constantly runs as a background process on the user's mobile device. The image capture event listener module is triggered when an image or a video is captured on the user's mobile device. The triggering event (the image or the video being captured by the image capture device on the user's mobile device) causes the mobile app to collect and store geographic location data and peripheral image data of the captured image or video for purposes of alignment. The peripheral image data includes, for example, imagery before and after the image/video is captured, as well as photographic elements outside of the intended frame. In some embodiments, the data is stored and cataloged as alignment reference data for the image or video file to be used in the event the user decides to later upload the captured image and/or video to a crowd-sourced location-based attraction preservation cloud service. In some embodiments, the image capture event listener module only runs as a constant background process on the user's mobile device when appropriate permissions are set in the mobile app and/or in the settings of the user's mobile device. In this way, the user can access, use, and/or upload their content to the crowd-sourced location-based attraction preservation cloud service whenever they want—whether immediately upon capturing the image(s) and/or video, or later, even days, weeks, or months after capturing the image(s) and/or video.

Turning to FIG. 10, a multi-stage crowd-sourced attraction preservation diagram 1000 is conceptually illustrated in which a user creates a crowd-sourced AR/VR simulation of a present attraction and makes it available to other users to view after the present attraction has finished. The example presented in this figure includes a user planning to capture archival footage of a parade. As shown in this figure, the multi-stage crowd-sourced attraction preservation diagram 1000 includes a first crowd-sourced attraction preservation stage 1010, a second crowd-sourced attraction preservation stage 1020, a third crowd-sourced attraction preservation stage 1030, and a fourth crowd-sourced attraction preservation stage 1040.

During the first crowd-sourced attraction preservation stage 1010, the user is holding a tablet computing device which includes an on-board video camera and/or image capture device (camera) to capture video and/or images of the parade. In this example, the user is located at a particular staging area from which he or she will capture video and/or images of the parade, including an initial image to be displayed as a reference image for future users who seek to playback the AR/VR site simulation of the attraction.

As taken from the first crowd-sourced attraction preservation stage 1010, the initial image may not be an alignment reference image captured prior to the parade, but instead, may be a based on a single frame image of the captured parade video (e.g., the "dog float"). Also, the user in this example is located at a particular staging area, but as a person skilled in the relevant art would appreciate, there can be multiple staging areas associated with the same attraction, site, or event. For example, a first user may be located along at a starting section of the parade route, while a second user may be located in another section, such as the ending section of the parade route, in order to capture video and/or images of the parade to contribute to a single crowd-sourced parade AR/VR simulation or to create an individual parade AR/VR simulation that is separate from the parade AR/VR simulation being created in relation to the first user. In some other embodiments, both the first and the second users contribute their respective content of the parade to a single crowd-sourced parade AR/VR simulation project. In this way, future users of the crowd-sourced parade AR/VR simulation may view the content of the first user at the starting section of the parade route and then move down the parade route to the ending section to retrieve and view the content of the second user at the ending section of the parade route, all within a single crowd-sourced parade AR/VR simulation.

Returning to FIG. 9, the crowd-sourced location-based attraction preservation process 900 of some embodiments associates (at 940) the geolocation of the user (based on the user's mobile device) with the reference image. In some embodiments, the crowd-sourced location-based attraction preservation process 900 associates the geolocation of the user with the reference image by adding the geolocation to a site location look-up table (LUT) which is available for mobile application users to download and store locally on a mobile device in order to identify any nearby locations of past attractions with corresponding AR/VR simulations. Files that include site location LUTs are described above by reference to FIG. 4. In some embodiments, the crowd-sourced location-based attraction preservation process 900 associates the geolocation of the user with the reference image by adding the geolocation to a past attraction site database, which is described above by reference to FIGS. 6 and 7, and described further below by reference to FIG. 11.

The steps 910-940 described above are typically completed in advance of an event, site, or attraction in which a user plans to capture content for the event, site, or attraction, such as an image, a video, an audio recording, etc. Therefore, after the preliminary set up steps 910-940, the crowd-sourced location-based attraction preservation process 900 of some embodiments captures (at 950) content of the live event, site, or attraction. In particular, the content that is captured includes at least one of an image, a video clip, and/or an audio recording during the live event, at the site, or in view of the attraction while the user is located at the staging area of the site.

Next, the crowd-sourced location-based attraction preservation process 900 transmits (at 960) the content captured from the live event, site, or attraction to the server that hosts the AR/VR site simulation service. For example, a replay AR cloud service may be accessible over the Internet and one or more users who capture content from the live event may contribute to the forthcoming AR/VR simulation of the site by providing their captured content.

By reference to FIG. 10, the parade is being captured by the user, as shown in the first crowd-sourced attraction preservation stage 1010, and the captured parade content is then uploaded to a server that hosts the AR/VR site simulation service (such as the replay AR cloud service), as shown in the second crowd-sourced attraction preservation stage 1020.

Turning back to FIG. 9, in some embodiments, the AR/VR simulation is not made available to others until content for the live event, site, or attraction is set for public access. Thus, when public access is not available, the crowd-sourced location-based attraction preservation process 900 sets private access only (980) for the user to preview when at the site. Then the crowd-sourced location-based attraction preservation process 900 returns to step 970 to determine whether to set the live event content to public access. On the other hand, when public access is available for the live event content, the crowd-sourced location-based attraction preservation process 900 of some embodiments allows (at 990) users in the general public to view the AR/VR site overlay when those users are physically present at or nearby the staging area from which the user captured the content to be used in making the AR/VR site simulation of the attraction. Then the crowd-sourced location-based attraction preservation process 900 ends.

Turning back to FIG. 10, as shown in the third crowd-sourced attraction preservation stage 1030, the parade AR/VR simulation of the site is being downloaded by a different user (e.g., a right handed user, as opposed to the left handed user shown in stages 1010 and 1020) at a different time (e.g., when the sun is positioned at the far right) from when the content for the AR/VR simulation of the site was captured (e.g., when the sun was positioned at the far left). Finally, the different user is shown in the fourth crowd-sourced attraction preservation stage 1040 viewing the AR overlay for the parade AR/VR simulation of the site while physically located at or near the staging area.

V. Network Architecture of an Attraction AR/VR Simulation Playback and Creation System By way of example, FIG. 11 conceptually illustrates a network architecture of an augmented reality and virtual reality location-based attraction simulation playback and creation system 1100 that simulates past attractions and preserves present attractions as location-based augmented reality and virtual reality simulations. As shown in this figure, the augmented reality and virtual reality location-based attraction simulation playback and creation system 1100 includes a historic site kiosk 1110, a local site-based mobile AR/VR simulation accessing device 1120, a geolocation based mobile AR/VR simulation accessing device 1130, a cell tower 1132, a gateway device 1134, a GPS satellite 1136, a geolocation based mobile VR simulation accessing device 1140 and user with VR goggles, AR/VR simulation servers 1150, an AR/VR simulation application database ("Host Apps" database) 1160, line of business (e.g., "LOB") servers 1170, a past attraction site database 1180, and a past attraction AR/VR content database 1190.

In some embodiments of the augmented reality and virtual reality location-based attraction simulation playback and creation system 1100, the AR/VR simulation servers 1150 provide an augmented reality and virtual reality content simulation creation and consumption platform. In some embodiments, the AR/VR simulation servers 1150 include a replay AR server that hosts a replay AR/VR cloud PaaS service and a create AR/VR cloud PaaS service. In some embodiments, the LOB servers 1170 of the augmented reality and virtual reality location-based attraction simulation playback and creation system 1100 include a past attraction augmented reality server and a past attraction virtual reality server. In some embodiments, the AR/VR simulation servers 1150 and the LOB servers 1070 are communicably connected over a private cloud network configured for private, verifiable, and authenticated access within the augmented reality and virtual reality location-based attraction simulation playback and creation system 1100.

In some embodiments, each user mobile device of the augmented reality and virtual reality location-based attraction simulation playback and creation system 1100, namely the local site-based mobile AR/VR simulation accessing device 1120, the geolocation based mobile AR/VR simulation accessing device 1130, and the geolocation based mobile VR simulation accessing device 1140 (as well as the VR goggles) includes a combination of augmented reality and virtual reality software application running on at least one processing unit of the respective mobile device such as, but not limited to, a tablet computing device, a mobile phone (or smartphone), VR glasses, VR goggles, and/or wearable VR headsets. In some embodiments, the user mobile devices download and install the augmented reality and virtual reality software application through the AR/VR simulation servers 1150, which retrieve the augmented reality and virtual reality software application from the Host Apps database 1160, and thereafter transmit the software to the user mobile device for local installation.

In some embodiments, the VR glasses, the VR goggles, and the wearable VR headsets may be paired to separate mobile computing devices via a near field wireless signal, such as Bluetooth, and may receive the AR/VR simulation content from the separate mobile computing when the separate mobile computing device receives the AR/VR simulation content from the replay AR server 1150 that hosts the replay AR/VR cloud PaaS service provided by the augmented reality and virtual reality location-based attraction simulation playback and creation system 1100. For example, the geolocation based mobile VR simulation accessing device 1140 receives a virtual reality simulation of a past attraction from the AR/VR simulation servers 1150 (over the Internet, shown within the augmented reality and virtual reality location-based attraction simulation playback and creation system 1100 as the "cloud") based on its present GPS determined geolocation. Upon receiving at least some of the AR/VR simulation, the geolocation based mobile VR simulation accessing device 1140 then starts streaming the virtual reality simulation to the VR goggles for the user of the geolocation based mobile VR simulation accessing device 1140 to view. Similarly, the geolocation based mobile AR/VR simulation accessing device 1130 receives wireless transmission of an AR/VR simulation from cell tower 1132 by way of the gateway 1134, which itself is connected (through the cloud) to the AR/VR simulation servers 1150.

In some embodiments, the augmented reality and virtual reality location-based attraction simulation playback and creation system 1100 is secure. In some embodiments, the augmented reality and virtual reality location-based attraction simulation playback and creation system 1100 includes full system-wide encryption of AR/VR site simulation content transmissions and data storage. In other words, all of the data structures and content stored in the past attraction site database 1180 and the past attraction AR/VR content database 1190 are encrypted, and only transmitted to end-user mobile devices for decryption upon valid authentication of user login credentials (e.g., username and password, MAC address or other hardware identifying information associated with a user's mobile device). Thus, from the perspective of the AR/VR simulation servers 1150, AR/VR simulation content is retrieved only upon an authorized request from a valid (i.e., authenticated) user mobile device.

In some embodiments of the augmented reality and virtual reality location-based attraction simulation playback and creation system 1100, a past attraction discovery request from a user mobile device includes a geolocation of the present physical location of the user mobile device, thereby allowing the AR/VR simulation servers 1150 to pass the geolocation to the LOB server 1170 for search and retrieval. That is, the LOB servers 1170 first search the past attraction site database 1180 for any sites or attractions that are nearby the geolocation of the user mobile device. The LOB servers 1170 of some embodiments apply filtering rules and threshold distances are calculated, when such configurable options are set. When a past attraction or site is determined to be nearby the geolocation of the user mobile device, then the LOB servers 1170 retrieve the past attraction site ID from the past attraction site database 1180. With the past attraction site ID at hand, the LOB servers 1170 then retrieve the AR/VR simulation content from the past attraction AR/VR content database 1190. When retrieval of the AR/VR simulation content is completed (or at least at a stage at which a stream can be opened), then the LOB servers 1170 transmit the fully encrypted AR/VR simulation content over the private cloud network back to the AR/VR simulation servers 1150. This allows the replay AR/VR cloud PaaS service, hosted on a replay AR/VR cloud server among the AR/VR simulation servers 1150, to transmit the encrypted AR/VR simulation content back to the requesting user mobile device for playback. When the requesting user mobile device receives the encrypted AR/VR simulation content transfer, the host app running on the user mobile device decrypts the encrypted stream for visual playback of the AR/VR simulation content on the user mobile device.

In some embodiments, AR/VR simulations are received locally by user mobile devices for playback at a local site. For example, the local site-based mobile AR/VR simulation accessing device 1120 receives wireless Bluetooth transmission of a historical AR/VR simulation (e.g., Gettysburg simulation) from a local AR/VR simulation replay server computing device that is physically present either in the historical site kiosk 1110 or connected to a local area network (LAN) near the kiosk 1110 and when the local site-based mobile AR/VR simulation accessing device 1120 scans a code (e.g., QR code) shown on the historic site kiosk 1110. In some embodiments, the locally provided AR/VR simulations are encrypted and stored in a local database that is communicably connected to the local server. In some embodiments, the AR/VR site simulation content is transferred wirelessly via Bluetooth or WiFi in fully encrypted format. So long as the requesting user mobile device is verified by authentication of user credentials or hardware identifying information, then the user mobile device receives the encrypted AR/VR site simulation content from the local server, and the host app running on the user mobile device decrypts the encoded data for playback on the user mobile device. In this way, AR/VR simulations can be accessed and replayed even when a user does not connect to a cloud server.

The above-described embodiments of the invention are presented for purposes of illustration and not of limitation.

VI. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 12 conceptually illustrates an electronic system 1200 with which some embodiments of the invention are implemented. The electronic system 1200 may be a computer, phone, PDA, or any other sort of electronic device. Such an electronic system includes various types of computer readable media and interfaces for various other types of computer readable media. Electronic system 1200 includes a bus 1205, processing unit(s) 1210, a system memory 1215, a read-only 1220, a permanent storage device 1225, input devices 1230, output devices 1235, and a network 1240.

The bus 1205 collectively represents all system, peripheral, and chipset buses that communicatively connect the numerous internal devices of the electronic system 1200. For instance, the bus 1205 communicatively connects the processing unit(s) 1210 with the read-only 1220, the system memory 1215, and the permanent storage device 1225.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1220 stores static data and instructions that are needed by the processing unit(s) 1210 and other modules of the electronic system. The permanent storage device 1225, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1225.

Other embodiments use a removable storage device (such as a floppy disk or a flash drive) as the permanent storage device 1225. Like the permanent storage device 1225, the system memory 1215 is a read-and-write memory device. However, unlike storage device 1225, the system memory 1215 is a volatile read-and-write memory, such as a random access memory. The system memory 1215 stores some of the instructions and data that the processor needs at runtime. In some embodiments, the invention's processes are stored in the system memory 1215, the permanent storage device 1225, and/or the read-only 1220. For example, the various memory units include instructions for processing appearance alterations of displayable characters in accordance with some embodiments. From these various memory units, the processing unit(s) 1210 retrieves instructions to execute and data to process in order to execute the processes of some embodiments.

The bus 1205 also connects to the input and output devices 1230 and 1235. The input devices enable the user to communicate information and select commands to the electronic system. The input devices 1230 include alphanumeric keyboards and pointing devices (also called "cursor control devices"). The output devices 1235 display images generated by the electronic system 1200. The output devices 1235 include printers and display devices, such as cathode ray tubes (CRT) or liquid crystal displays (LCD). Some embodiments include devices such as a touchscreen that functions as both input and output devices.

Finally, as shown in FIG. 12, bus 1205 also couples electronic system 1200 to a network 1240 through a network adapter (not shown). In this manner, the computer can be a part of a network of computers (such as a local area network ("LAN"), a wide area network ("WAN"), or an intranet), or a network of networks (such as the Internet). Any or all components of electronic system 1200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While the invention has been described with reference to numerous specific details, one of ordinary skill in the art will recognize that the invention can be embodied in other specific forms without departing from the spirit of the invention. For instance, FIGS. 1-2, 4, 6-7, and 9 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

I claim:

1. An augmented reality (AR) and virtual reality (VR) location-based attraction simulation playback and creation system that simulates past attractions and preserves present attractions as location-based AR and VR simulations, said AR and VR location-based attraction simulation playback and creation system comprising:

a server computing device comprising a server computing device processor, a server computing device persistent storage device, a server random access memory (RAM) module, and a server software application that is stored in the server computing device persistent storage device, wherein when the software application is loaded into the server RAM module and run on the server computing device processor, the server software application provides a location-based past attraction simulation service to allow a user to request and receive location-based past attraction simulations for playback on a computing device of the user;

a past attraction content database that stores location-based past attraction simulations, each location-based past attraction simulation comprising a set of past attraction content;

a past attraction site database that stores identifying information for each location-based past attraction simulation, wherein the identifying information for each location-based past attraction simulation comprises (i) a present geolocation of a past attraction site that is associated with a physical location of an attraction from a past time to which the location-based past attraction simulation corresponds and (ii) a unique identifier of the past attraction site that is associated with the physical location of the attraction from the past time to which the location-based past attraction simulation corresponds; and a user computing device comprising a user computing device processor, a user computing device persistent storage device, a user computing device RAM module, a user computing device display screen, and a software application that is stored in the user computing device persistent storage device, wherein when the software application is loaded into the user computing device RAM module and run on the user computing device processor, the location-based past attraction software application includes sets of instructions for (i) connecting to the location-based past attraction simulation service, (ii) identifying a particular present geolocation of the user computing device, (iii) determining whether there is an active past attraction site at or proximate to the particular present geolocation, (iv) requesting a particular location-based past attraction simulation of the active past attraction site when the active past attraction site is at or proximate to the particular present geolocation, (v) receiving the particular location-based past attraction simulation from the server computing device, and (vi) playing the particular location-based past attraction simulation on the user computing device display screen while the user computing device remains at or proximate to the particular present geolocation.

2. The AR and VR location-based attraction simulation playback and creation system of claim 1, wherein the set of past attraction content associated with the particular location-based past attraction simulation of the active past attraction comprises a video clip of the attraction from the past time.

3. The AR and VR location-based attraction simulation playback and creation system of claim 1, wherein the location-based past attraction software application further includes a set of instructions for providing the particular present geolocation of the user computing device when requesting the particular location-based past attraction simulation.

4. The AR and VR location-based attraction simulation playback and creation system of claim 1 further comprising a kiosk with a kiosk-based local server that provides a nearby location-based past attraction simulation based on a site ID.

5. The AR and VR location-based attraction simulation playback and creation system of claim 4, wherein the location-based past attraction software application further includes a set of instructions for scanning an encoded site ID symbol visible on a housing of the kiosk.

6. The AR and VR location-based attraction simulation playback and creation system of claim 5, wherein the location-based past attraction software application further includes a set of instructions for receiving the nearby location-based past attraction simulation via wireless Bluetooth transmission from the kiosk.

7. The AR and VR location-based attraction simulation playback and creation system of claim 1, wherein the user computing device comprises a mobile computing device that is paired to a pair of virtual reality goggles.

8. The AR and VR location-based attraction simulation playback and creation system of claim 7, wherein the location-based past attraction software running on the user computing device processor comprises sets of instructions for selecting a location-based past attraction VR simulation and visually outputting the location-based past attraction VR simulation in the virtual reality goggles.

9. The AR and VR location-based attraction simulation playback and creation system of claim 1, wherein the user computing device comprises a mobile computing device that is capable of augmented reality playback of AR simulations, wherein the user computing device display screen comprises a mobile device screen, wherein the augmented reality playback of AR simulations is visually output as an AR simulation of the active past attraction while the mobile computing device remains at or proximate to the particular present geolocation.

10. The AR and VR location-based attraction simulation playback and creation system of claim 9, wherein the location-based past attraction software running on the user computing device processor comprises sets of instructions for selecting a particular location-based past attraction AR simulation associated with the attraction from the past time at the particular present geolocation and visually outputting onto the mobile device screen the particular location-based past attraction AR simulation to overlay a presently captured video of present scenery at the particular present geolocation while the mobile computing device remains at or proximate to the particular present geolocation.

11. The AR and VR location-based attraction simulation playback and creation system of claim 1, wherein the attraction from the past time comprises one of a past attraction that is presently defunct, a past attraction that is presently decommissioned, and an event that occurred during the past time.

* * * * *